(12) United States Patent
Ichikawa et al.

(10) Patent No.: US 9,545,850 B2
(45) Date of Patent: Jan. 17, 2017

(54) VEHICLE

(75) Inventors: Shinji Ichikawa, Toyota (JP); Satoru Horiuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/357,848

(22) PCT Filed: Nov. 25, 2011

(86) PCT No.: PCT/JP2011/077225
§ 371 (c)(1),
(2), (4) Date: May 13, 2014

(87) PCT Pub. No.: WO2013/076870
PCT Pub. Date: May 30, 2013

(65) Prior Publication Data
US 2014/0305722 A1    Oct. 16, 2014

(51) Int. Cl.
*B60L 11/00*    (2006.01)
*B60L 11/18*    (2006.01)
*B60L 11/12*    (2006.01)
*B60L 11/14*    (2006.01)

(52) U.S. Cl.
CPC ............ *B60L 11/005* (2013.01); *B60L 11/123* (2013.01); *B60L 11/14* (2013.01); *B60L 11/182* (2013.01); *B60L 11/1829* (2013.01); *B60L 2270/147* (2013.01); *Y02T 10/6217* (2013.01); *Y02T 10/7005* (2013.01); *Y02T 10/7072* (2013.01); *Y02T 10/7077* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y10S 903/907* (2013.01)

(58) Field of Classification Search
USPC ........................................ 180/65.31
See application file for complete search history.

(56) References Cited

U.S. PATENT DOCUMENTS

| | | | |
|---|---|---|---|
| 7,741,734 | B2 | 6/2010 | Joannopoulos et al. |
| 2007/0222542 | A1 | 9/2007 | Joannopoulos et al. |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

*Primary Examiner* — Jeffrey J Restifo
*Assistant Examiner* — Erez Gurari
(74) *Attorney, Agent, or Firm* — Oliff PLC

(57) ABSTRACT

This vehicle includes a vehicle-mounted component mounted below a rear floor panel and an electric power reception device mounted below the rear floor panel and including an electric power reception portion receiving electric power in a non-contact manner from an electric power transmission device including an externally provided electric power transmission portion, and the vehicle-mounted component is arranged flush with and around the electric power reception device.

16 Claims, 17 Drawing Sheets

(56) References Cited

U.S. PATENT DOCUMENTS

| | | |
|---|---|---|
| 2010/0065352 A1 | 3/2010 | Ichikawa |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0201316 A1 | 8/2010 | Takada et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0214926 A1 | 9/2011 | Ichikawa |
| 2011/0254376 A1 | 10/2011 | Sasaki et al. |
| 2011/0273025 A1 | 11/2011 | Amano et al. |
| 2013/0026850 A1 | 1/2013 | Throngnumchai et al. |
| 2013/0037365 A1* | 2/2013 | Ichikawa ................ 191/10 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 | 12/2009 |
| EP | 2 344 359 A2 | 7/2011 |
| IN | 735/DELNP/2008 | 5/2008 |
| IN | 6195/DELNP/2009 | 7/2010 |
| JP | A-2008-288889 | 11/2008 |
| JP | A-2009-501510 | 1/2009 |
| JP | 2010-093957 A | 4/2010 |
| JP | A-2010-70048 | 4/2010 |
| JP | A-2010-98257 | 4/2010 |
| JP | A-2010-130800 | 6/2010 |
| JP | 2010-183811 A | 8/2010 |
| JP | 2010-268664 A | 11/2010 |
| JP | 2011-121456 A | 6/2011 |
| JP | 2011-176914 A | 9/2011 |
| JP | A-2011-193671 | 9/2011 |
| JP | 2011-204836 A | 10/2011 |
| JP | A-2011-229360 | 11/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/041320 A1 | 4/2010 |
| WO | 20101106648 A1 | 9/2010 |
| WO | 2011/114208 A2 | 9/2011 |
| WO | 2011/117714 A2 | 9/2011 |

* cited by examiner

VEHICLE

TECHNICAL FIELD

The present invention relates to a vehicle incorporating an electric power reception device used in an electric power transmission system.

BACKGROUND ART

A hybrid vehicle, an electric car, and the like in which drive wheels are driven with electric power from a battery or the like have recently attracted attention in consideration of environments.

In particular in recent years, for an electrically powered vehicle incorporating a battery as above, wireless charging with which a battery can be charged in a non-contact manner without using a plug or the like has attracted attention. Recently, various charging schemes have been proposed also for non-contact charging schemes.

For example, Japanese Patent Laying-Open No. 2010-070048 (PTD 1), Japanese Patent Laying-Open No. 2008-288889 (PTD 2), and Japanese Patent Laying-Open No. 2010-098257 (PTD 3) are directed to an electric power transmission system using a non-contact charging scheme.

In these electric power transmission systems, an electric power reception device is mounted on a vehicle side. In order to actually place an electric power reception portion on a vehicle, it is necessary to take into account leakage of electromagnetic waves from the electric power reception device. In addition, since the electric power reception device should be mounted in a limited space in a vehicle, arrangement relation between the electric power reception device and a vehicle-mounted component arranged on a vehicle side should be considered.

CITATION LIST

Patent Document

PTD 1: Japanese Patent Laying-Open No. 2010-070048
PTD 2: Japanese Patent Laying-Open No. 2008-288889
PTD 3: Japanese Patent Laying-Open No. 2010-098257

SUMMARY OF INVENTION

Technical Problem

Therefore, the present invention was made to solve the problems described above, and provides a vehicle including a structure allowing an electric power reception device to efficiently be mounted in a limited space in the vehicle, in consideration of leakage of electromagnetic waves from the electric power reception device in a case that the electric power reception device is arranged in the vehicle.

Solution to Problem

A vehicle based on the present invention includes a vehicle-mounted component mounted below a floor panel of the vehicle and an electric power reception device mounted below the floor panel and including an electric power reception portion receiving electric power in a non-contact manner from an electric power transmission device including an externally provided electric power transmission portion, and the vehicle-mounted component is arranged flush with and around the electric power reception device.

In another embodiment, the vehicle-mounted component has a region facing the electric power reception device subjected to a shielding process.

In another embodiment, the floor panel has a region facing the electric power reception device subjected to a shielding process.

In another embodiment, the electric power reception portion has a resonant coil, and a side of the resonant coil facing the vehicle-mounted component has a region arranged at a constant distance from the vehicle-mounted component.

In another embodiment, the resonant coil has a regular polygonal shape having as one side, the region arranged at the constant distance.

In another embodiment, the vehicle includes a shielding member arranged around the electric power reception device between the vehicle-mounted component and the electric power reception device, and the electric power reception device has a shape in conformity with an outer geometry of the shielding member.

In another embodiment, the vehicle-mounted component includes a muffler or an exhaust pipe, the electric power reception device includes a capacitor, and at least a part of the electric power reception portion is located between the capacitor and the muffler or the exhaust pipe.

In another embodiment, the vehicle-mounted component is a member selected from the group consisting of a side member, a rear suspension, a front suspension, a fuel tank, a fuel hose, a muffler, an exhaust pipe, a tire wheel, a vehicle height sensor, a brake, a brake hose, an engine, an oil pan, a battery, a motor unit, a power control unit, a radiator, a steering mechanism, and a window washer tank.

In another embodiment, a difference in natural frequency between the electric power transmission portion and the electric power reception portion is not higher than 10% of the natural frequency of the electric power reception portion.

In another embodiment, a coefficient of coupling between the electric power reception portion and the electric power transmission portion is not greater than 0.1.

The electric power reception portion receives electric power from the electric power transmission portion through at least one of magnetic field formed between the electric power reception portion and the electric power transmission portion and oscillating at a specific frequency and electric field formed between the electric power reception portion and the electric power transmission portion and oscillating at a specific frequency.

Advantageous Effects of Invention

According to this invention, a vehicle including a structure allowing an electric power reception device to efficiently be mounted in a limited space in the vehicle, in consideration of leakage of electromagnetic waves from the electric power reception device in a case that the electric power reception device is arranged in the vehicle, can be provided.

DESCRIPTION OF EMBODIMENTS

Figure 1:
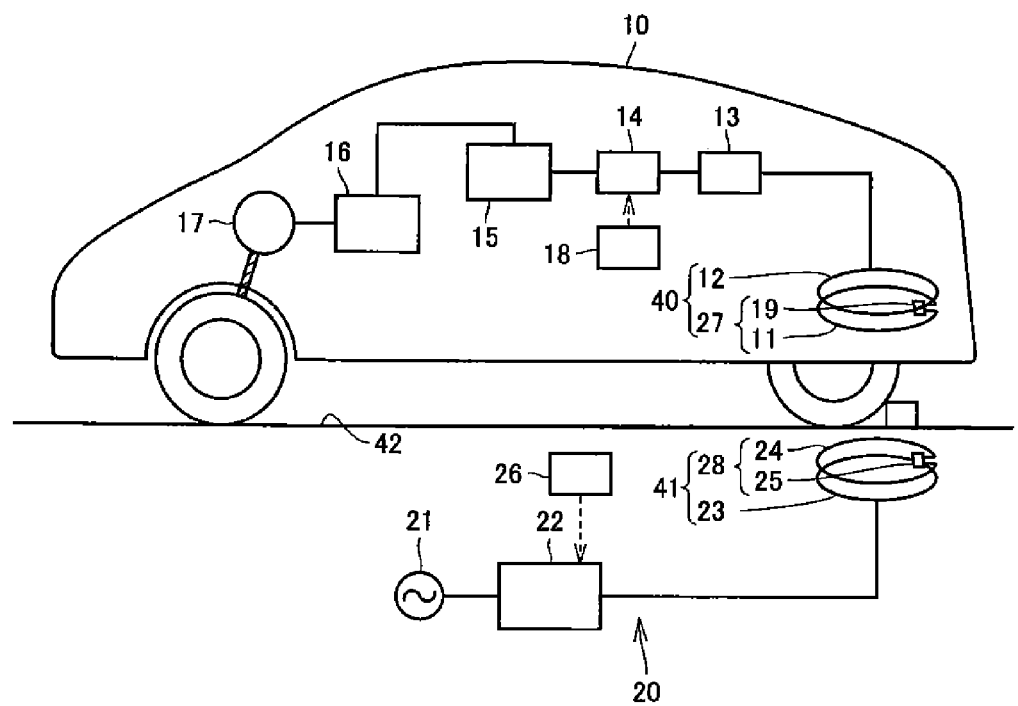
FIG. 1 is a diagram schematically illustrating a vehicle incorporating an electric power transmission device, an electric power reception device, and an electric power transmission system in a first embodiment.

A vehicle incorporating an electric power transmission device, an electric power reception device, and an electric power transmission system in an embodiment based on the present invention will be described hereinafter with reference to the drawings. It is noted that, when the number, an amount or the like is mentioned in each embodiment described below, the scope of the present invention is not necessarily limited to the number, the amount or the like, unless otherwise specified. In addition, the same or corresponding elements have the same reference characters allotted and redundant description may not be repeated. Moreover, combination for use of features in each embodiment as appropriate is originally intended.

First Embodiment

A vehicle incorporating an electric power transmission system according to the present embodiment will be described with reference to FIG. 1. FIG. 1 is a diagram schematically illustrating a vehicle incorporating an electric power transmission device, an electric power reception device, and an electric power transmission system in an embodiment.

The electric power transmission system according to the present first embodiment has an electrically powered vehicle 10 including an electric power reception device 40 and an external power feed device 20 including an electric power transmission device 41. Electric power reception device 40 of electrically powered vehicle 10 mainly receives electric power from electric power transmission device 41 as a car stops at a prescribed position in a parking space 42 provided with electric power transmission device 41.

In parking space 42, a chock or a line indicating a parking position and a parking area is provided so as to stop electrically powered vehicle 10 at the prescribed position.

External power feed device 20 includes a high-frequency electric power driver 22 connected to an AC power supply 21, a control unit 26 controlling drive of high-frequency electric power driver 22 and the like, and electric power transmission device 41 connected to this high-frequency electric power driver 22. Electric power transmission device 41 includes an electric power transmission portion 28 and an electromagnetic induction coil 23. Electric power transmission portion 28 includes a resonant coil 24 and a capacitor 25 connected to resonant coil 24. Electromagnetic induction coil 23 is electrically connected to high-frequency electric power driver 22. Though capacitor 25 is provided in the example shown in this FIG. 1, capacitor 25 is not necessarily an essential feature.

Electric power transmission portion 28 includes an electric circuit formed from an inductance of resonant coil 24 as well as a stray capacitance of resonant coil 24 and a capacitance of capacitor 25.

Electrically powered vehicle 10 includes electric power reception device 40, a rectifier 13 connected to electric power reception device 40, a DC/DC converter 14 connected to this rectifier 13, a battery 15 connected to this DC/DC converter 14, a power control unit (PCU) 16, a motor unit 17 connected to this power control unit 16, and a vehicle ECU (Electronic Control Unit) 18 controlling drive of DC/DC converter 14, power control unit 16, or the like. It is noted that electrically powered vehicle 10 according to the present embodiment is a hybrid vehicle including a not-shown engine, however, it includes also an electric car and a fuel cell vehicle so long as a vehicle is driven by a motor.

Rectifier 13 is connected to an electromagnetic induction coil 12 and converts an AC current supplied from electromagnetic induction coil 12 to a DC current and supplies the DC current to DC/DC converter 14.

DC/DC converter 14 regulates a voltage of the DC current supplied from rectifier 13 and supplies the resultant DC current to battery 15. It is noted that DC/DC converter 14 is not an essential feature and no DC/DC converter may be provided. In this case, by providing a matching device for impedance matching with external power feed device 20 between electric power transmission device 41 and high-frequency electric power driver 22, DC/DC converter 14 can be substituted for.

Power control unit 16 includes a converter connected to battery 15 and an inverter connected to this converter, and the converter regulates (boosts) a DC current supplied from battery 15 and supplies the resultant DC current to the inverter. The inverter converts the DC current supplied from the converter to an AC current and supplies the AC current to motor unit 17.

For example, a three-phase AC motor or the like is adopted as motor unit 17, and motor unit 17 is driven by an AC current supplied from the inverter of power control unit 16.

It is noted that, in a case that electrically powered vehicle 10 is a hybrid vehicle, electrically powered vehicle 10 further includes an engine. Motor unit 17 includes a motor generator mainly functioning as a generator and a motor generator mainly functioning as a motor.

Electric power reception device 40 includes an electric power reception portion 27 and electromagnetic induction coil 12. Electric power reception portion 27 includes a resonant coil 11 and a capacitor 19. Resonant coil 11 has a stray capacitance. Therefore, electric power reception portion 27 has an electric circuit formed from an inductance of resonant coil 11 and capacitances of resonant coil 11 and capacitor 19. It is noted that capacitor 19 is not an essential feature and no capacitor can be provided.

In the electric power transmission system according to the present embodiment, a difference in natural frequency between electric power transmission portion 28 and electric power reception portion 27 is not higher than 10% of the natural frequency of electric power reception portion 27 or electric power transmission portion 28. By setting a natural frequency of each of electric power transmission portion 28 and electric power reception portion 27 within such a range, electric power transmission efficiency can be enhanced. On the other hand, when a difference in natural frequency is higher than 10% of the natural frequency of electric power reception portion 27 or electric power transmission portion 28, electric power transmission efficiency is lower than 10% and such a disadvantage as a longer period of time for charging of battery 15 is caused.

Here, a natural frequency of electric power transmission portion 28 means an oscillation frequency in a case that an electric circuit formed from an inductance of resonant coil 24 and a capacitance of resonant coil 24 when capacitor 25 is not provided freely oscillates. When capacitor 25 is provided, a natural frequency of electric power transmission portion 28 means an oscillation frequency in a case that an electric circuit formed from capacitances of resonant coil 24 and capacitor 25 and an inductance of resonant coil 24 freely oscillates. A natural frequency at the time when braking force or electric resistance is set to zero or substantially zero in the electric circuit above is also referred to as a resonance frequency of electric power transmission portion 28.

Similarly, a natural frequency of electric power reception portion 27 means an oscillation frequency in a case that an electric circuit formed from an inductance of resonant coil 11 and a capacitance of resonant coil 11 when no capacitor 19 is provided freely oscillates. When capacitor 19 is provided, a natural frequency of electric power reception portion 27 means an oscillation frequency in a case that an electric circuit formed from capacitances of resonant coil 11 and capacitor 19 and an inductance of resonant coil 11 freely oscillates. A natural frequency at the time when braking force and electrical resistance are set to zero or substantially zero in the electric circuit is also referred to as a resonance frequency of electric power reception portion 27.

Figure 2:
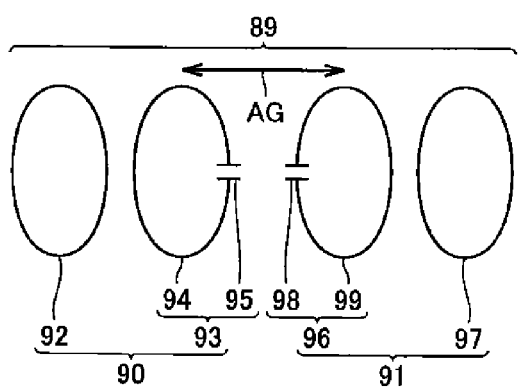
FIG. 2 is a diagram showing a simulation model of the electric power transmission system.

Simulation results from analysis of relation between a difference in natural frequency and electric power transmission efficiency will be described with reference to FIGS. 2 and 3. FIG. 2 shows a simulation model of the electric power transmission system. An electric power transmission system 89 includes an electric power transmission device 90 and an electric power reception device 91 and electric power transmission device 90 includes an electromagnetic induction coil 92 and an electric power transmission portion 93. Electric power transmission portion 93 includes a resonant coil 94 and a capacitor 95 provided in resonant coil 94.

Electric power reception device 91 includes an electric power reception portion 96 and an electromagnetic induction coil 97. Electric power reception portion 96 includes a resonant coil 99 and a capacitor 98 connected to this resonant coil 99.

An inductance of resonant coil 94 is denoted as an inductance Lt and a capacitance of capacitor 95 is denoted as a capacitance C1. An inductance of resonant coil 99 is denoted as an inductance Lr and a capacitance of capacitor 98 is denoted as a capacitance C2. With setting of each parameter as such, a natural frequency f1 of electric power transmission portion 93 is expressed in an equation (1) below and a natural frequency f2 of electric power reception portion 96 is expressed in an equation (2) below.

$$f1=1/\{2\pi(Lt \times C1)^{1/2}\} \quad (1)$$

$$f2=1/\{2\pi(Lr \times C2)^{1/2}\} \quad (2)$$

Figure 3:
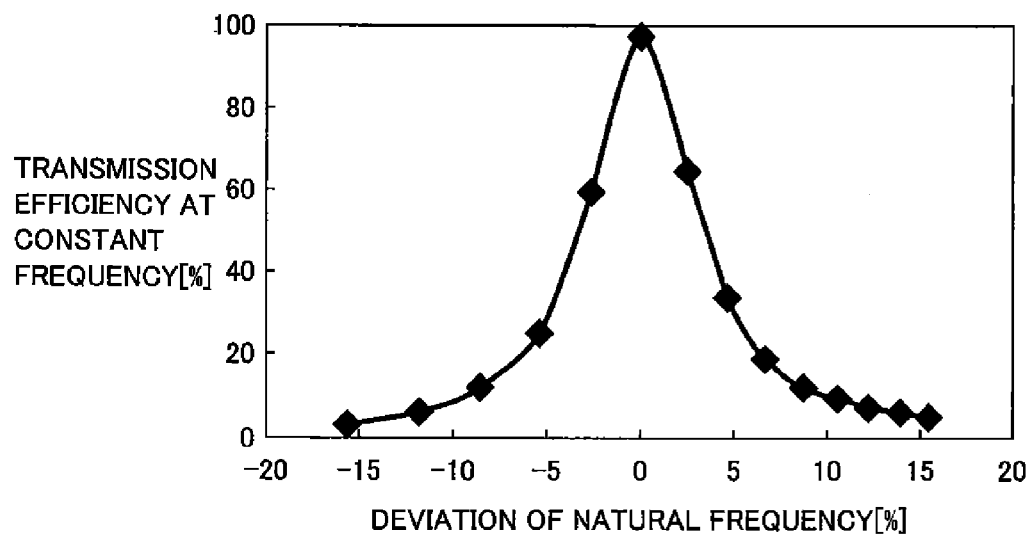
FIG. 3 is a diagram showing simulation results.

Here, relation between deviation in natural frequency between electric power transmission portion 93 and electric power reception portion 96 and electric power transmission efficiency in a case that inductance Lr and capacitances C1, C2 are fixed and only inductance Lt is varied is shown in FIG. 3. It is noted that, in this simulation, relative positional relation between resonant coil 94 and resonant coil 99 is fixed and in addition, a frequency of a current supplied to electric power transmission portion 93 is constant.

In the graph shown in FIG. 3, the abscissa represents deviation (%) in natural frequency and the ordinate represents transmission efficiency (%) at a constant frequency. Deviation (%) in natural frequency is expressed in an equation (3) below.

$$(\text{Deviation in Natural Frequency}) = \{(f1-f2)/f2\} \times 100 \, (\%) \quad (3)$$

As is clear also from FIG. 3, when deviation (%) in natural frequency is ±0%, electric power transmission efficiency is close to 100%. When deviation (%) in natural frequency is ±5%, electric power transmission efficiency is 40%. When deviation (%) in natural frequency is ±10%, electric power transmission efficiency is 10%. When deviation (%) in natural frequency is ±15%, electric power transmission efficiency is 5%. Namely, it can be seen that electric power transmission efficiency can be enhanced by setting a natural frequency of each of the electric power transmission portion and the electric power reception portion such that an absolute value of deviation (%) in natural frequency (difference in natural frequency) is not greater than 10% of the natural frequency of electric power reception portion 96. In addition, it can be seen that electric power transmission efficiency can further be enhanced by setting a natural frequency of each of the electric power transmission portion and the electric power reception portion such that an absolute value of deviation (%) in natural frequency is not higher than 5% of the natural frequency of electric power reception portion 96. It is noted that electromagnetic field analysis software (TMAG (trademark): manufactured by JSOL Corporation)) is adopted as simulation software.

An operation of the electric power transmission system according to the present embodiment will now be described.

In FIG. 1, electromagnetic induction coil 23 is supplied with AC power from high-frequency electric power driver 22. As a prescribed AC current flows through electromagnetic induction coil 23, the AC current also flows through resonant coil 24 based on electromagnetic induction. Here, electric power is supplied to electromagnetic induction coil 23 such that a frequency of the AC current which flows through resonant coil 24 attains to a specific frequency.

As a current of a specific frequency flows through resonant coil 24, electromagnetic field oscillating at a specific frequency is formed around resonant coil 24.

Resonant coil 11 is arranged within a prescribed range from resonant coil 24, and resonant coil 11 receives electric power from electromagnetic field formed around resonant coil 24.

In the present embodiment, what is called a helical coil is adopted for resonant coil 11 and resonant coil 24. Therefore, magnetic field oscillating at a specific frequency is mainly formed around resonant coil 24, and resonant coil 11 receives electric power from that magnetic field.

Here, magnetic field at a specific frequency formed around resonant coil 24 will be described. "Magnetic field at a specific frequency" typically has relationship with electric power transmission efficiency and a frequency of a current supplied to resonant coil 24. Therefore, initially, relation between electric power transmission efficiency and a frequency of a current supplied to resonant coil 24 will be described. Electric power transmission efficiency at the time when electric power is transmitted from resonant coil 24 to resonant coil 11 varies depending on various factors such as a distance between resonant coil 24 and resonant coil 11. For example, a natural frequency (resonance frequency) of electric power transmission portion 28 and electric power reception portion 27 is defined as a natural frequency f0, a frequency of a current supplied to resonant coil 24 is defined as a frequency f3, and an air gap between resonant coil 11 and resonant coil 24 is defined as an air gap AG.

Figure 4:
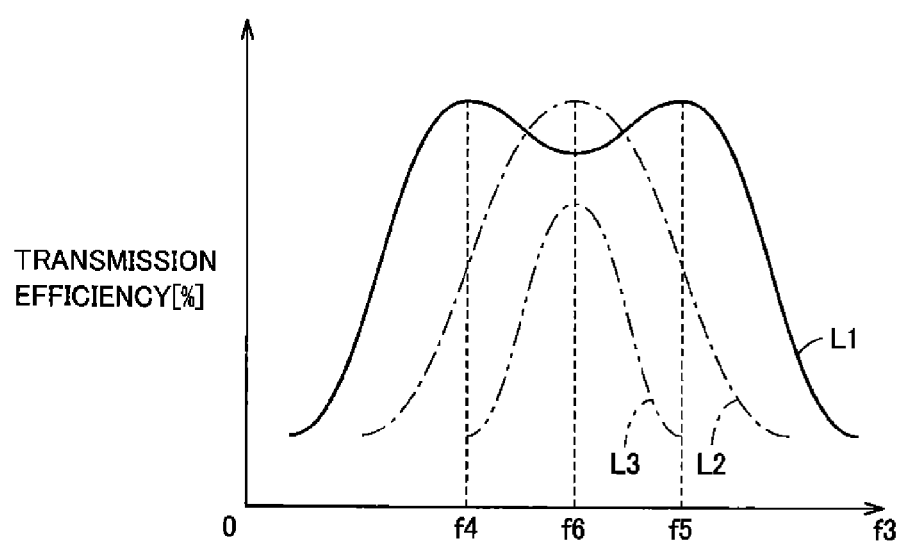
FIG. 4 is a diagram showing relation between electric power transmission efficiency at the time when an air gap is varied while a natural frequency is fixed and a frequency f of a current supplied to a resonant coil.

FIG. 4 is a graph showing relation between electric power transmission efficiency at the time when air gap AG is varied while natural frequency f0 is fixed and frequency f3 of a current supplied to resonant coil 24.

In the graph shown in FIG. 4, the abscissa represents frequency f3 of a current supplied to resonant coil 24 and the ordinate represents electric power transmission efficiency (%). An efficiency curve L1 schematically shows relation between electric power transmission efficiency at the time when air gap AG is small and frequency f3 of a current supplied to resonant coil 24. As shown with this efficiency curve L1, when air gap AG is small, a peak of electric power transmission efficiency appears at frequencies f4, f5 (f4<f5). As air gap AG is increased, two peaks at which electric power transmission efficiency is high are varied to be close to each other. Then, as shown with an efficiency curve L2, when air gap AG is greater than a prescribed distance, one peak of electric power transmission efficiency appears, and electric power transmission efficiency attains to a peak when a frequency of a current supplied to resonant coil 24 attains to a frequency f6. As air gap AG is further increased as compared with the state shown with efficiency curve L2, the peak of electric power transmission efficiency is lower as shown with an efficiency curve L3.

For example, a first technique as follows is possible as a technique for improving electric power transmission efficiency. As a first technique, a technique of varying characteristics of electric power transmission efficiency between electric power transmission portion 28 and electric power reception portion 27 by maintaining a frequency of a current supplied to resonant coil 24 shown in FIG. 1 constant in accordance with air gap AG and varying a capacitance of capacitor 25 or capacitor 19 is possible. Specifically, capacitances of capacitor 25 and capacitor 19 are adjusted such that electric power transmission efficiency attains to peak while a frequency of a current supplied to resonant coil 24 is maintained constant. With this technique, regardless of a size of air gap AG, a frequency of a current which flows through resonant coil 24 and resonant coil 11 is constant. It is noted that a technique of making use of a matching device provided between electric power transmission device 41 and high-frequency electric power driver 22, a technique of making use of converter 14, or the like can also be adopted as a technique of varying characteristics of electric power transmission efficiency.

A second technique is a technique of adjusting a frequency of a current supplied to resonant coil 24 based on a size of air gap AG. For example, in a case that electric power transmission characteristics exhibit efficiency curve L1 in FIG. 4, a current having a frequency of frequency f4 or frequency f5 is supplied to resonant coil 24. Then, in a case that frequency characteristics exhibit efficiency curve L2, L3, a current having a frequency of frequency f6 is supplied to resonant coil 24. In this case, a frequency of a current which flows through resonant coil 24 and resonant coil 11 is varied in accordance with a size of air gap AG.

With the first technique, a frequency of a current which flows through resonant coil 24 attains to a fixed constant frequency, and with the second technique, a frequency which flows through resonant coil 24 attains to a frequency which varies as appropriate depending on air gap AG. With the first technique, the second technique, or the like, a current at a specific frequency set to achieve high electric power transmission efficiency is supplied to resonant coil 24. As a current at a specific frequency flows through resonant coil 24, magnetic field (electromagnetic field) oscillating at a specific frequency is formed around resonant coil 24. Electric power reception portion 27 receives electric power from electric power transmission portion 28 through magnetic field formed between electric power reception portion 27 and electric power transmission portion 28 and oscillating at a specific frequency. Therefore, "magnetic field oscillating at a specific frequency" is not necessarily magnetic field at a fixed frequency. Though a frequency of a current supplied to resonant coil 24 is set with attention being paid to air gap AG in the example above, electric power transmission efficiency is varied also by other factors such as displacement in a horizontal direction of resonant coil 24 and resonant coil 11, and a frequency of a current supplied to resonant coil 24 may be adjusted based on those other factors.

Though an example in which a helical coil is adopted for a resonant coil has been described in the present embodiment, in a case that an antenna such as a meandering line is adopted for a resonant coil, a current at a specific frequency flows through resonant coil 24 and thus electric field at a specific frequency is formed around resonant coil 24. Then, electric power is transmitted between electric power transmission portion 28 and electric power reception portion 27 through this electric field.

Figure 5:
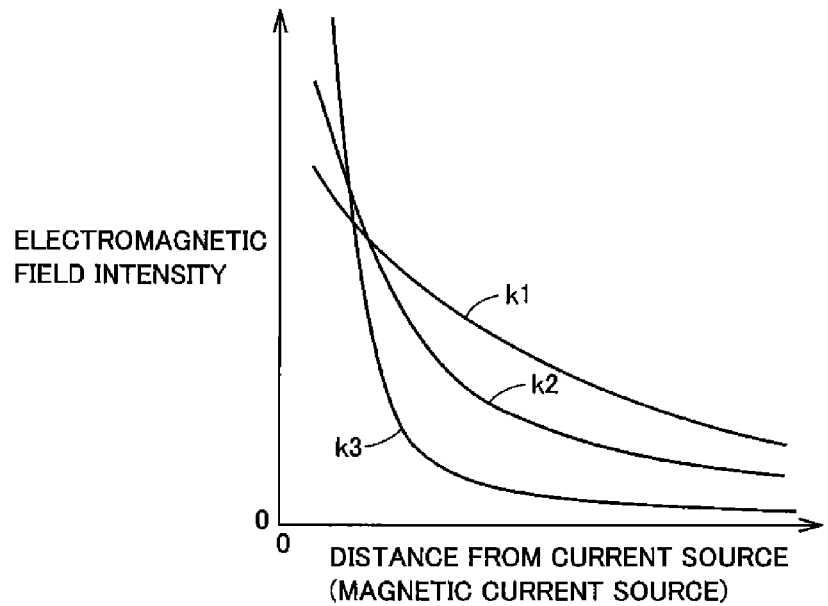
FIG. 5 is a diagram showing relation between a distance from a current source (magnetic current source) and intensity of electromagnetic field.

In the electric power transmission system according to the present embodiment, near field (evanescent field) where "static electric field" of electromagnetic field is dominant is made use of in order to improve efficiency in transmission and reception of electric power. FIG. 5 is a diagram showing relation between a distance from a current source (magnetic current source) and electromagnetic field intensity. Referring to FIG. 5, electromagnetic field is constituted of three components. A curve k1 represents a component inversely proportional to a distance from a wave source and it is referred to as "radiation electric field." A curve k2 represents a component inversely proportional to a square of a distance from a wave source and it is referred to as "induction electric field." In addition, a curve k3 represents a component inversely proportional to a cube of a distance from a wave source and it is referred to as "static electric field." It is noted that, with a wavelength of electromagnetic field being denoted as "λ", a distance at which "radiation electric field," "induction electric field," and "static electric field" are substantially equal in intensity can be expressed as $\lambda/2\pi$.

"Static electric field" is an area where intensity of electromagnetic waves sharply decreases with a distance from the wave source, and in the electric power transmission system according to the present embodiment, near field (evanescent field) where this "static electric field" is dominant is made use of for transmitting energy (electric power). Namely, electric power transmission portion 28 and electric power reception portion 27 (for example, a pair of LC resonance coils) having close natural frequencies are caused to resonate in near field where "static electric field" is dominant, so that energy (electric power) is transmitted from electric power transmission portion 28 to the other electric power reception portion 27. Since this "static electric field" does not propagate energy over a long distance, a resonant method can achieve electric power transmission with less energy loss than electromagnetic waves transmitting energy (electric power) by means of the "radiation electric field" propagating energy over a long distance.

Thus, in the electric power transmission system according to the present embodiment, electric power is transmitted from electric power transmission device 41 to the electric power reception device by causing electric power transmission portion 28 and electric power reception portion 27 to resonate through electromagnetic field. A coefficient of coupling (κ) between electric power transmission portion 28 and electric power reception portion 27 is preferably not greater than 0.1. It is noted that a coefficient of coupling (κ) is not limited to this value and it can take various values at which good electric power transmission is achieved. Generally, in electric power transmission making use of electromagnetic induction, a coefficient of coupling (κ) between the electric power transmission portion and the electric power reception portion is close to 1.0.

Coupling between electric power transmission portion 28 and electric power reception portion 27 in electric power transmission in the present embodiment is referred to, for example, as "magnetic resonant coupling," "magnetic field resonant coupling," "electromagnetic field resonance coupling," or "electric field resonance coupling."

"Electromagnetic resonance coupling" means coupling including any of "magnetic resonant coupling," "magnetic field resonant coupling," and "electric field resonance coupling."

Since an antenna in a coil shape is adopted for resonant coil 24 of electric power transmission portion 28 and resonant coil 11 of electric power reception portion 27 described herein, electric power transmission portion 28 and electric power reception portion 27 are coupled to each other mainly through magnetic field, and electric power transmission portion 28 and electric power reception portion 27 are in "magnetic resonant coupling" or "magnetic field resonant coupling."

It is noted that, for example, an antenna such as a meandering line can also be adopted for resonant coils 24, 11, and in this case, electric power transmission portion 28 and electric power reception portion 27 are coupled to each other mainly through electric field. Here, electric power transmission portion 28 and electric power reception portion 27 are in "electric field resonance coupling."

(Electric Power Reception Device 40)

Figure 6:
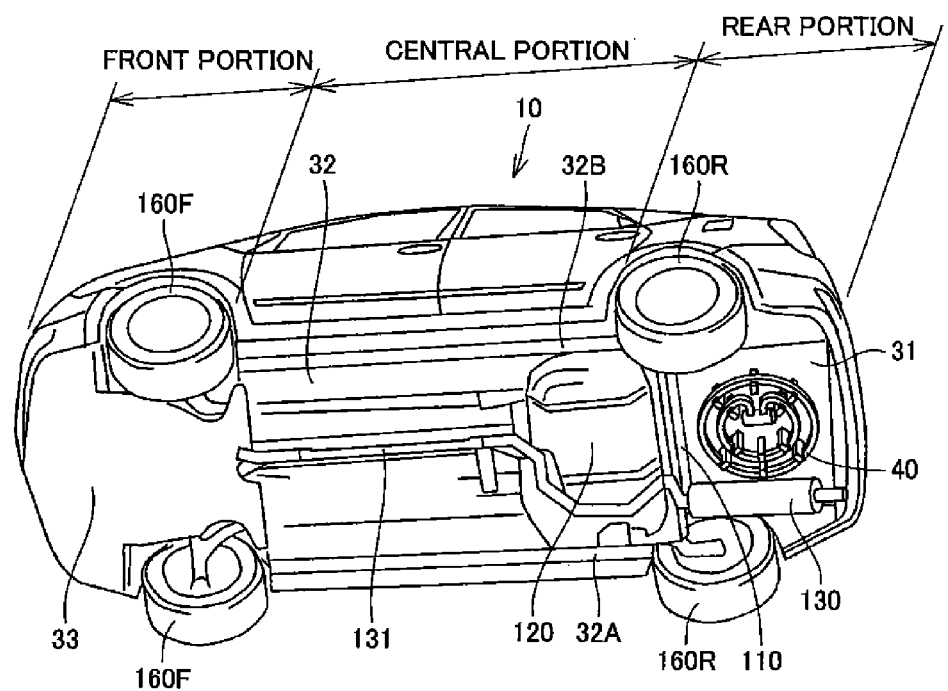
FIG. 6 is a bottom view of a vehicle showing a construction of the electric power reception device mounted on the vehicle in the first embodiment.
Figure 8:
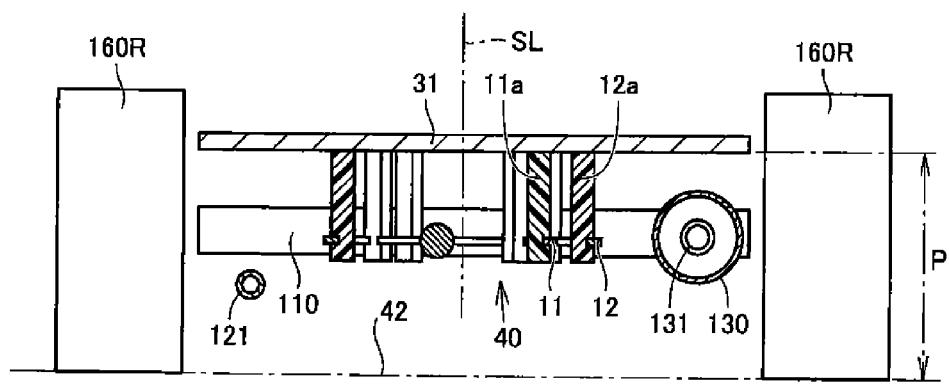
FIG. 8 is a cross-sectional view along an arrow line VIII-VIII in FIG. 7.
Figure 9:
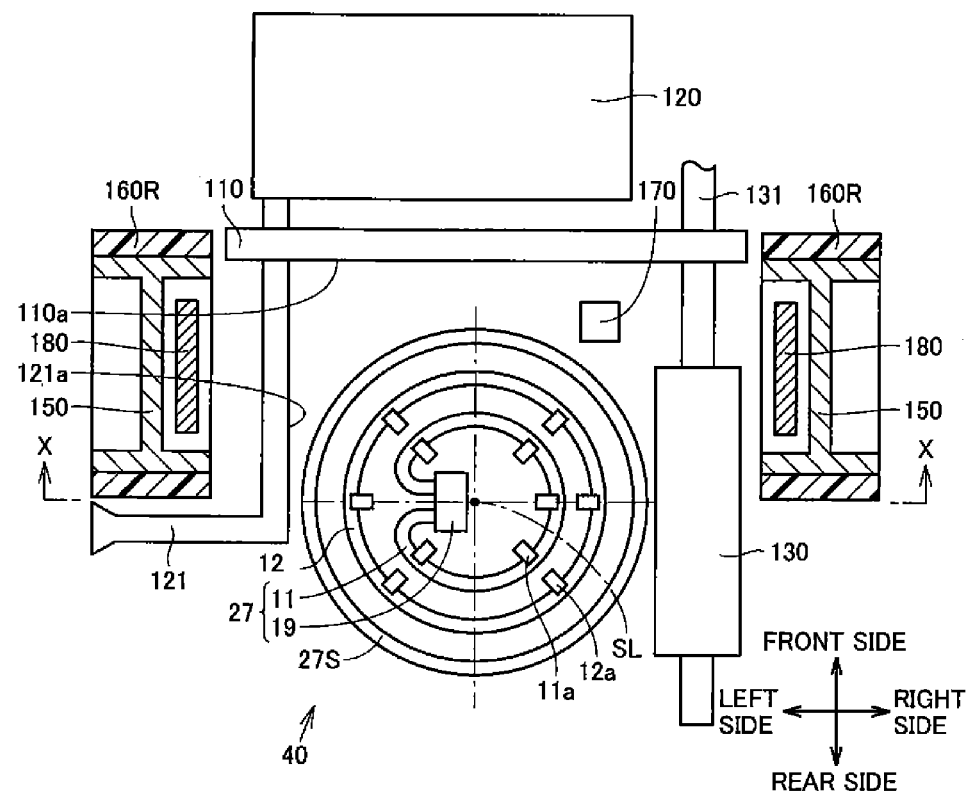
FIG. 9 is a plan view of the rear portion of the vehicle showing another construction of the electric power reception device mounted on the vehicle in the first embodiment.
Figure 10:
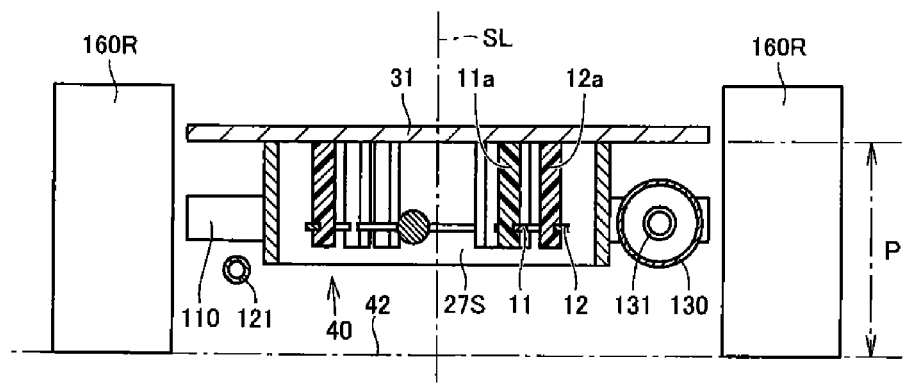
FIG. 10 is a cross-sectional view along an arrow line X-X in FIG. 9.
Figure 11:
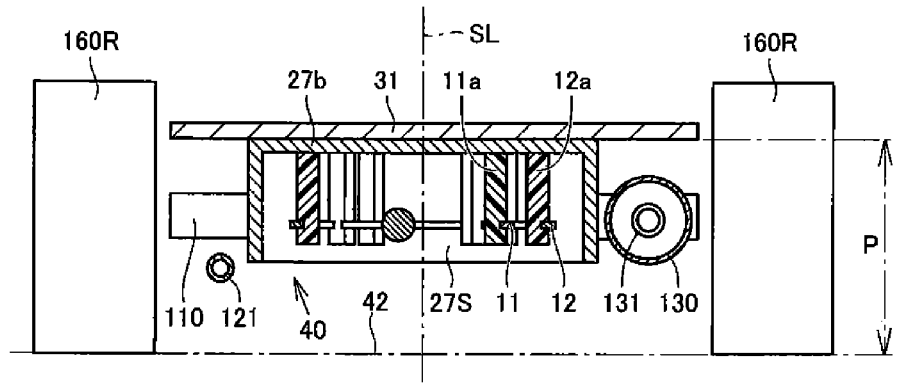
FIG. 11 is a cross-sectional view of another form corresponding to the cross-section along the arrow line X-X in FIG. 9.
Figure 12:
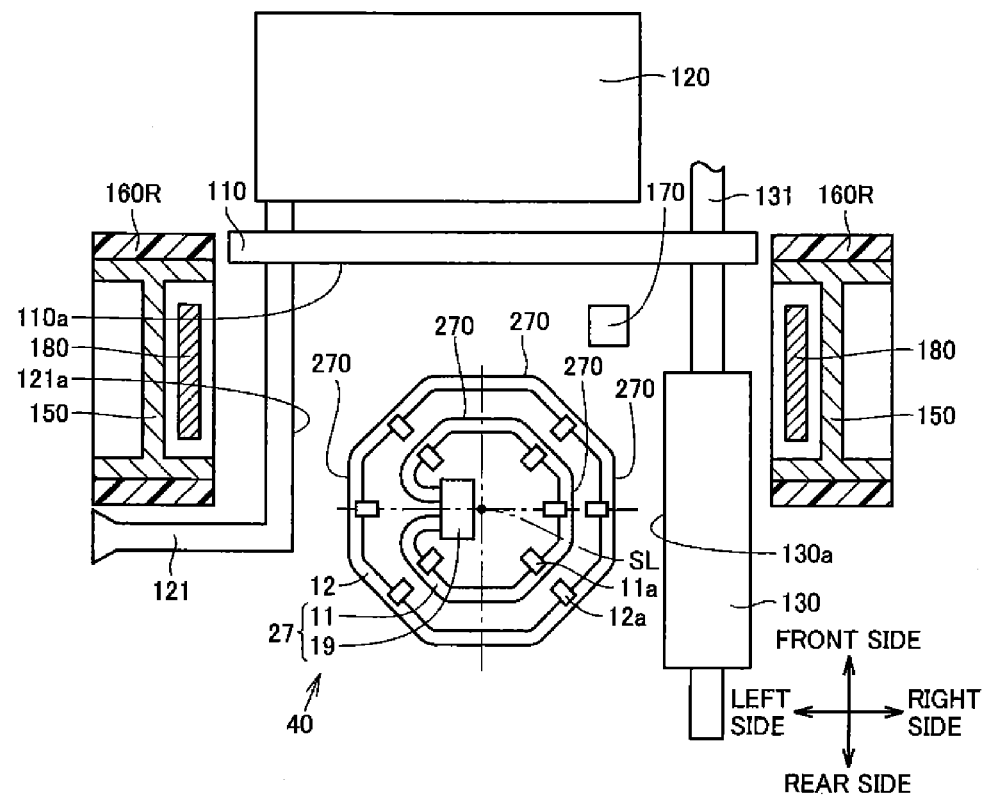
FIG. 12 is a plan view of the rear portion of the vehicle showing yet another construction of the electric power reception device mounted on the vehicle in the first embodiment.
Figure 13:
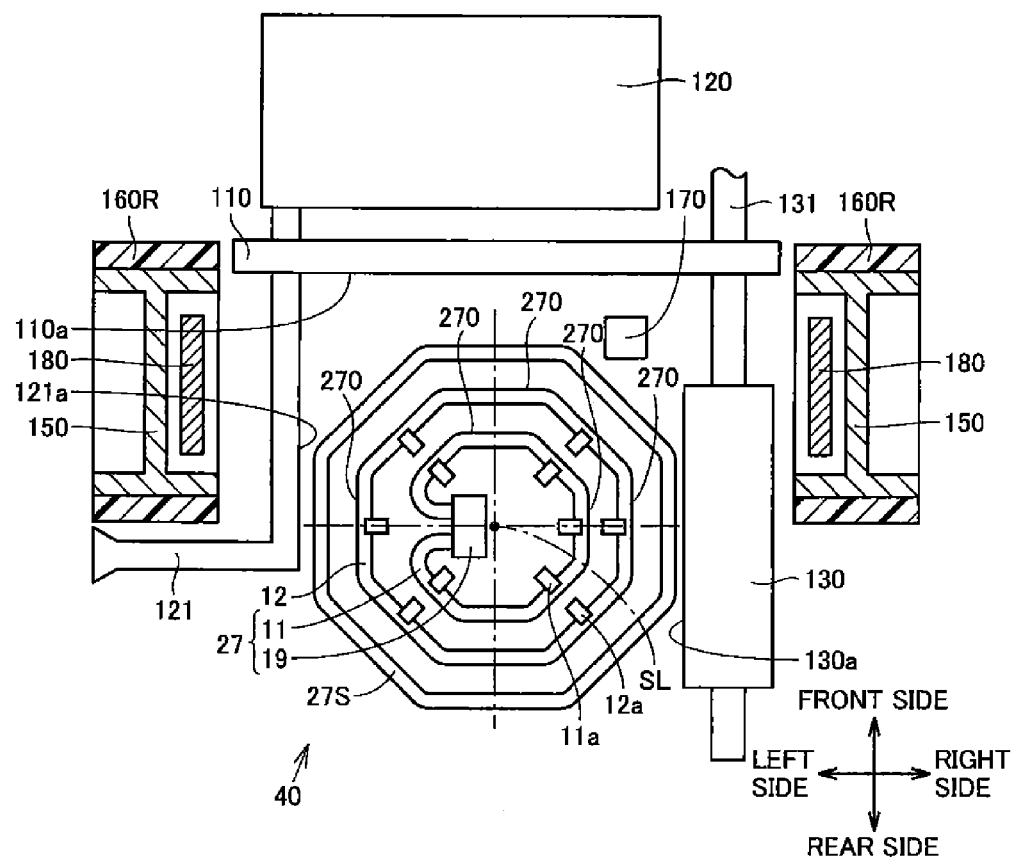
FIG. 13 is a plan view of the rear portion of the vehicle showing yet another construction of the electric power reception device mounted on the vehicle in the first embodiment.

A specific construction of electric power reception device 40 in the first embodiment will be described with reference to FIGS. 6 to 13. FIG. 6 is a bottom view of the vehicle showing a construction of electric power reception device 40 mounted on electrically powered vehicle 10 in the present embodiment, FIG. 7 is a plan view of a rear portion of the vehicle showing a construction of electric power reception device 40 mounted on electrically powered vehicle 10 in the present embodiment, FIG. 8 is a cross-sectional view along an arrow line VIII-VIII in FIG. 7, FIG. 9 is a plan view of the rear portion of the vehicle showing another construction of electric power reception device 40 mounted on electrically powered vehicle 10 in the present embodiment, FIG. 10 is a cross-sectional view along an arrow line X-X in FIG. 9, FIG. 11 is a cross-sectional view of another form corresponding to the cross-section along the arrow line X-X in FIG. 9, and FIGS. 12 and 13 are each a plan view of the rear portion of the vehicle showing yet another construction of electric power reception device 40 mounted on electrically powered vehicle 10 in the present embodiment.

As shown in FIG. 6, a region from a front end of electrically powered vehicle 10 to a rear end of a front wheel tire 160F is referred to as a front portion, a region from front wheel tire 160F to a front end of rear wheel tire 160R is referred to as a central portion, and a region from a rear end of rear wheel tire 160R to a rear end of electrically powered vehicle 10 is referred to as a rear portion, which is also applicable to the description below.

Figure 7:
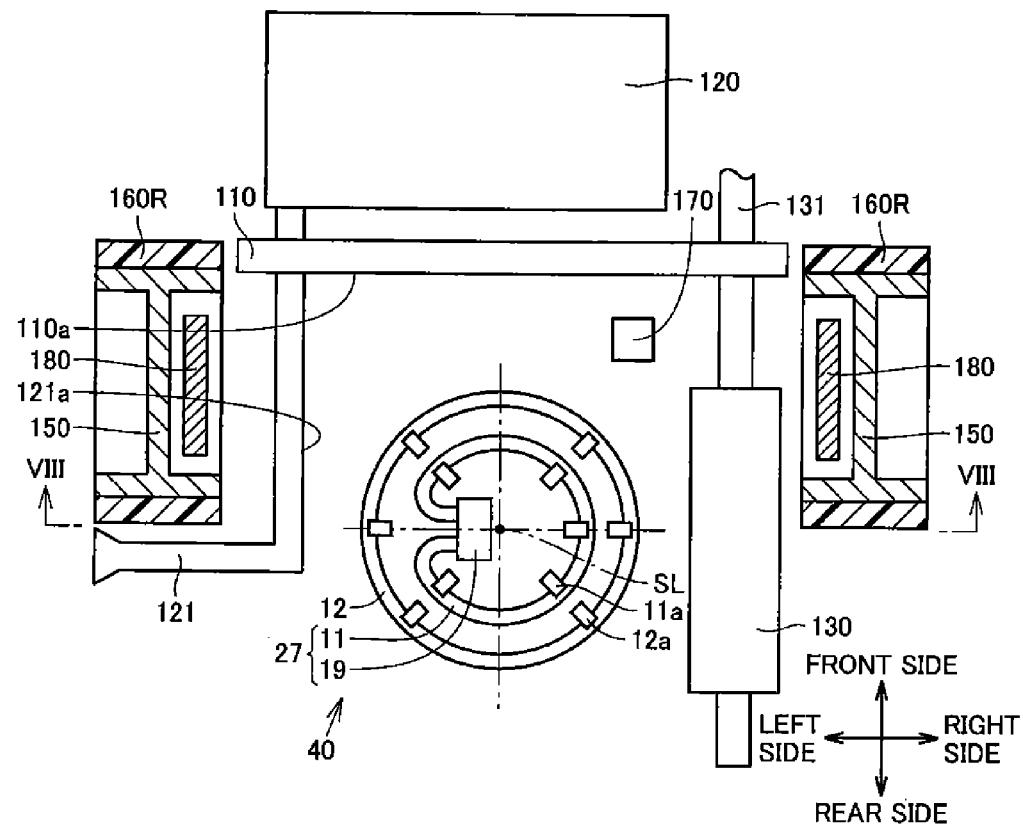
FIG. 7 is a plan view of a rear portion of the vehicle showing a construction of the electric power reception device mounted on the vehicle in the first embodiment.

In addition, as shown in FIG. 7, a forward side of electrically powered vehicle 10 is referred to as a front side, a rearward side is referred to as a rear side, left when viewed from a forward direction is referred to as a left side, and right when viewed from the forward direction is referred to as a right side. Moreover, while electrically powered vehicle 10 remains stopped on a horizontal plane, a vertically upward orientation is referred to as above and a vertically downward orientation is referred to as below. Furthermore, the left side means a left side in facing the forward direction (front side) of electrically powered vehicle 10, and the right side means a right side in facing the forward direction (front side) of the electrically powered vehicle. The above is also applicable to the description below.

As shown in FIG. 6, in electrically powered vehicle 10 in the present embodiment, electric power reception device 40 is arranged in the rear portion of electrically powered vehicle 10. Electric power reception device 40 includes electric power reception portion 27 and annular electromagnetic induction coil 12. Electric power reception portion 27 has annular resonant coil 11 and capacitor 19. Resonant coil 11 is fixed to a rear floor panel 31 with the use of a support member 11a made of resin. Electromagnetic induction coil 12 is fixed to rear floor panel 31 with the use of a support member 12a made of resin. Though electromagnetic induction coil 12 is arranged on an outer side of resonant coil 11 in the present embodiment, arrangement relation between resonant coil 11 and electromagnetic induction coil 12 is not limited to this arrangement relation.

As shown in FIGS. 7 and 8, in the present embodiment, electric power reception device 40 and a plurality of vehicle-mounted components are mounted below rear floor panel 31 forming the floor panel, and in addition, a plurality of vehicle-mounted components are arranged in a region (below) except for a side of electric power reception device 40 facing electric power transmission device 41 (see FIG. 1).

Specifically, a rear suspension 110, a fuel tank 120, a fuel hose 121, a muffler 130, an exhaust pipe 131, left and right tire wheels 150, left and right rear wheel tires 160R, a vehicle height sensor 170, and left and right brakes 180 are arranged substantially flush with and around electric power reception device 40.

Referring to FIG. 8, a plane here means a virtual space extending in a horizontal direction having a thickness of a height P lying between a horizontal plane 42 and rear floor panel 31 when electrically powered vehicle 10 is placed on horizontal plane 42, and being flush means that a plurality of vehicle-mounted components are located in a virtual space extending in a horizontal direction having a thickness of height P. The above is also applicable to the central portion and the front portion of the vehicle in an embodiment which will be described later.

A metal material such as iron or aluminum is used for rear floor panel 31 as well as rear suspension 110, fuel tank 120, fuel hose 121, muffler 130, exhaust pipe 131, left and right tire wheels 150, vehicle height sensor 170, and left and right brakes 180 which are the plurality of vehicle-mounted components described above.

These metal materials such as iron and aluminum have such a shielding effect that electromagnetic waves are converted to an eddy current when electromagnetic waves reach, however, preferably, a material lower in impedance than iron, aluminum, or the like is used such that, preferably, electromagnetic waves which have reached are efficiently converted to an eddy current and the shielding effect is enhanced.

Then, rear floor panel 31 and the vehicle-mounted components above have at least a region (surface) facing electric power reception device 40 subjected to a shielding process, so that the vehicle-mounted components above preferably have a shielding function for cutting off leaked electromagnetic waves.

Shielding means a function to suppress advance of electromagnetic waves beyond a vehicle-mounted component when electromagnetic waves reach rear floor panel 31 and the vehicle-mounted component, and specifically means suppression of advance of electromagnetic waves by conversion of electromagnetic waves which have reached to an eddy current. The region (surface) facing electric power reception device 40 means a region which electromagnetic waves directly or indirectly reach when electromagnetic waves are considered to radially be emitted from electric power reception device 40. This is also applicable to each embodiment below.

By way of one example of a shielding process, rear floor panel 31 and a vehicle-mounted component can have a shielding effect by bonding a material lower in impedance than rear floor panel 31 and the vehicle-mounted component to rear floor panel 31 and the vehicle-mounted component. Another example of a shielding process is exemplified by a plating process, an application process, and arrangement of a metal plate.

In order to lower loss of the shielding effect, an impedance value of a shielding member is preferably lower. In addition, a copper foil having a thickness of approximately 1 mm is preferably employed as a material. Alternatively, such a material as silver, aluminum, or iron, which has a high dielectric constant, can also be employed.

It is noted that, when a material high in shielding effect (a material low in impedance) is originally used for rear floor panel 31 and a vehicle-mounted component, it is not necessary to subject surfaces of rear floor panel 31 and the vehicle-mounted component to a shielding process. Aluminum or the like is exemplified as a material high in shielding effect.

In FIG. 8, regarding specific regions of rear floor panel 31 and a vehicle-mounted component to be subjected to a shielding process, bonding to the entire surface of rear floor panel 31 (lower surface), rear suspension 110, fuel tank 120, fuel hose 121, muffler 130, exhaust pipe 131, left and right tire wheels 150, vehicle height sensor 170, and left and right brakes 180 is preferred, however, increase in cost is concerned.

Then, in rear floor panel 31, rear suspension 110, fuel tank 120, fuel hose 121, muffler 130, exhaust pipe 131, left and right tire wheels 150, vehicle height sensor 170, and left and right brakes 180, at least a region (surface) facing electric power reception device 40 is preferably subjected to a shielding process. As described above, a region (surface) facing electric power reception device 40 means a region which electromagnetic waves directly or indirectly reach when electromagnetic waves are considered to radially be emitted from electric power reception device 40.

Thus, since it is not necessary to separately provide a shielding member for shielding against electromagnetic waves which leak from electric power reception device 40, electric power reception device 40 can efficiently be mounted in a limited space in electrically powered vehicle 10 while leakage of electromagnetic waves from electric power reception device 40 in a case that electric power reception device 40 is arranged in the rear portion of electrically powered vehicle 10 is taken into account.

Consequently, a large area of electric power reception device 40 facing electric power transmission device 41 can be secured, and characteristics against position displacement from electric power transmission device 41 can be improved. Lowering in transmission efficiency can thus be suppressed.

In addition, cost can also be lowered by decreasing the number of parts. Moreover, reduction in size of electric power reception device 40 and reduction in size of electrically powered vehicle 10 can also be contemplated.

In the present embodiment, at least a part of resonant coil 11 of electric power reception portion 27 and a part of electromagnetic induction coil 12 are located between capacitor 19 adopted in electric power reception device 40 and muffler 130. A part of resonant coil 11 and a part of electromagnetic induction coil 12 being located between capacitor 19 and muffler 130 means such arrangement relation that, when capacitor 19 and muffler 130 are connected to each other with a straight line, a part of resonant coil 11 and a part of electromagnetic induction coil 12 cross that straight line.

Thus, influence on capacitor 19 by heat emitted from muffler 130 (variation in capacity based on temperature characteristics) can be avoided and stability of conduction efficiency in electric power reception device 40 can be maintained. It is noted that, when influence on capacitor 19 by heat emitted from muffler 130 does not give rise to a problem, a position of arrangement of capacitor 19 is not particularly restricted.

Another construction of electric power reception device 40 is shown with reference to FIG. 9. When there is a sufficient room in a space in a rear region of electrically powered vehicle 10, a shielding member 27S can also be provided so as to surround an outer side in a direction of radius of electric power reception device 40 as shown in FIG. 9. Resonant coil 11 and electromagnetic induction coil 12 each have a shape in conformity with an outer geometry of shielding member 27S.

Referring to FIG. 10, shielding member 27S has a cylindrical shape surrounding the outer side in the direction of radius of electric power reception device 40 and opens on a side of rear floor panel 31 and on a side of electric power transmission portion 28. An end portion on the rear floor panel 31 side of shielding member 27S is directly fixed to rear floor panel 31. Shielding member 27S and rear floor panel 31 are connected such that they can electrically be conducting.

Regarding a material for shielding member 27S, shielding member 27S itself may be formed of a material high in shielding effect described above, or such a construction that a material high in shielding effect is bonded to a side which electric power reception device 40 faces may be acceptable.

By providing shielding member 27S, an interval between resonant coil 11 and electromagnetic induction coil 12, and shielding member 27S becomes constant. Thus, permeability between shielding member 27S, and resonant coil 11 and electromagnetic induction coil 12 can readily be known and system design can be facilitated. In addition, when shielding member 27S is provided, it is not necessary to subject a vehicle-mounted component located around electric power reception device 40 to a shielding process.

Referring to FIG. 10, though rear floor panel 31 and shielding member 27S are members separate from each other, shielding member 27S can also be provided in rear floor panel 31 by molding into one piece.

Referring to FIG. 11, a bottom portion 27b can also be provided on a rear floor panel 31 side of shielding member 27S. When bottom portion 27b is provided, support member 11a holding resonant coil 11 and support member 12a holding electromagnetic induction coil 12 are fixed to bottom portion 27b. Bottom portion 27b desirably has a shielding effect similar to that of shielding member 27S. Thus, shielding member 27S and electric power reception device 40 can be assembled in advance and the assembly can be fixed to rear floor panel 31, so that an assembly operation can be more efficient. In a case that bottom portion 27b having a shielding effect is provided, rear floor panel 31 does not necessarily have to be subjected to a shielding process.

Yet another construction of the electric power reception device is shown with reference to FIG. 12. In the construction shown in FIG. 7, a case that annular resonant coil 11 and annular electromagnetic induction coil 12 are adopted in electric power reception device 40 has been shown. Resonant coil 11 and electromagnetic induction coil 12 shown in FIG. 12 each have a regular octagonal shape.

By adopting a coil shape of a regular octagonal shape for resonant coil 11 and electromagnetic induction coil 12, it becomes easy to avoid interference with a vehicle-mounted component, and electric power reception device 40 can efficiently be mounted in the rear region of electrically powered vehicle 10.

In addition, by adopting a coil shape of a regular octagonal shape, a straight portion 270 is created in each of resonant coil 11 and electromagnetic induction coil 12. In vehicle-mounted components, a straight portion 110a is present in rear suspension 110, a straight portion 121a is present in fuel hose 121, and a straight portion 130a is present in muffler 130.

Electric power reception device 40 is arranged such that straight portions 110a, 121a, 130a of these vehicle-mounted components and straight portions 270 of resonant coil 11 and electromagnetic induction coil 12 are in parallel. In a region where they are arranged in parallel, the vehicle-mounted components and resonant coil 11 and electromagnetic induction coil 12 are arranged such that a distance therebetween is constant.

Thus, since resonant coil 11 and electromagnetic induction coil 12 on a side facing the vehicle-mounted components have a region arranged at a constant distance from each vehicle-mounted component, a large space for mounting resonant coil 11 and electromagnetic induction coil 12 can be secured while interference with the vehicle-mounted components is avoided. Therefore, a coil having a greater outer diameter can be mounted and electric power reception device 40 capable of transmitting high electric power can be mounted.

In addition, as in the present embodiment, resonant coil 11 and electromagnetic induction coil 12 each have a regular polygonal shape having region 270 arranged at a constant distance as one side, so that resonant coil 11 and electromagnetic induction coil 12 can be mounted while interference with vehicle-mounted components is avoided and characteristics against position displacement can be made uniform by employing a coil shape of a regular polygonal shape.

It is noted that a coil shape is not limited to a regular octagonal shape. Straight portion 270 with which a distance between a vehicle-mounted component and electric power reception device 40 is constant should only be present in a coil, with respect to the straight portion of the vehicle-mounted component. Therefore, a polygonal shape or combination of a straight shape and a curved shape is acceptable.

A region where a vehicle-mounted component, and resonant coil 11 and electromagnetic induction coil 12 are arranged at a constant distance from each other is not limited to straight lines but it may be curved surfaces. For example, in a case that fuel hose 121 is disposed to draw a curve, a curved region at a constant distance along the curve of fuel hose 121 can also be provided in resonant coil 11 and electromagnetic induction coil 12.

Another construction of electric power reception device 40 is shown with reference to FIG. 13. When there is a sufficient room in a space in the rear region of electrically powered vehicle 10, shielding member 27S can also be provided so as to surround the outer side in the direction of radius of electric power reception device 40 as shown in FIG. 13. Since shielding member 27S has a regular octagonal form, resonant coil 11 and electromagnetic induction coil 12 also have a regular octagonal shape in conformity with an outer geometry of shielding member 27S. For a structure of shielding member 27S, a structure similar to that of shielding member 27S shown in FIGS. 9 to 11 can be adopted.

With this construction as well, regarding provision of shielding member 27S, an interval between resonant coil 11 and electromagnetic induction coil 12, and shielding member 27S becomes constant. Thus, permeability between shielding member 27S, and resonant coil 11 and electromagnetic induction coil 12 can readily be known and system design can be facilitated.

Regarding adoption of a polygonal shape, by adopting a coil shape of a regular octagonal shape for resonant coil 11 and electromagnetic induction coil 12, it becomes easy to avoid interference with a vehicle-mounted component, and electric power reception device 40 can efficiently be mounted in the rear region of electrically powered vehicle 10.

In addition, by adopting a coil shape of a regular octagonal shape, straight portion 270 is created in each of resonant coil 11 and electromagnetic induction coil 12. In vehicle-mounted components, straight portion 110a is present in rear suspension 110, straight portion 121a is present in fuel hose 121, and straight portion 130a is present in muffler 130.

Electric power reception device 40 is arranged such that straight portions 110a, 121a, 130a of these vehicle-mounted components and straight portions 270 of resonant coil 11 and electromagnetic induction coil 12 are in parallel. In a region where they are arranged in parallel, the vehicle-mounted components and resonant coil 11 and electromagnetic induction coil 12 are arranged such that a distance therebetween is constant.

Thus, since resonant coil 11 and electromagnetic induction coil 12 on a side facing the vehicle-mounted components have a region arranged at a constant distance from each vehicle-mounted component, a large space for mounting resonant coil 11 and electromagnetic induction coil 12 can be secured while interference with the vehicle-mounted components is avoided. Therefore, a coil having a greater outer diameter can be mounted and electric power reception device 40 capable of transmitting high electric power can be mounted.

In addition, as in the present embodiment, resonant coil 11 and electromagnetic induction coil 12 each have a regular polygonal shape having region 270 arranged at a constant distance as one side, so that resonant coil 11 and electromagnetic induction coil 12 can be mounted while interference with a vehicle-mounted component is avoided and characteristics against position displacement can be made uniform by employing a coil shape of a regular polygonal shape.

Other functions and effects in provision of shielding member 27S and adoption of a polygonal shape are the same as in the constructions shown in FIGS. 9 to 11.

Second Embodiment

The vehicle incorporating the electric power transmission system according to the present embodiment will now be described with reference to FIGS. 14 to 18. It is noted that difference from the first embodiment described above is a position where electric power reception device 40 is mounted on electrically powered vehicle 10, and therefore, only the difference will be described below in detail.

Figure 14:
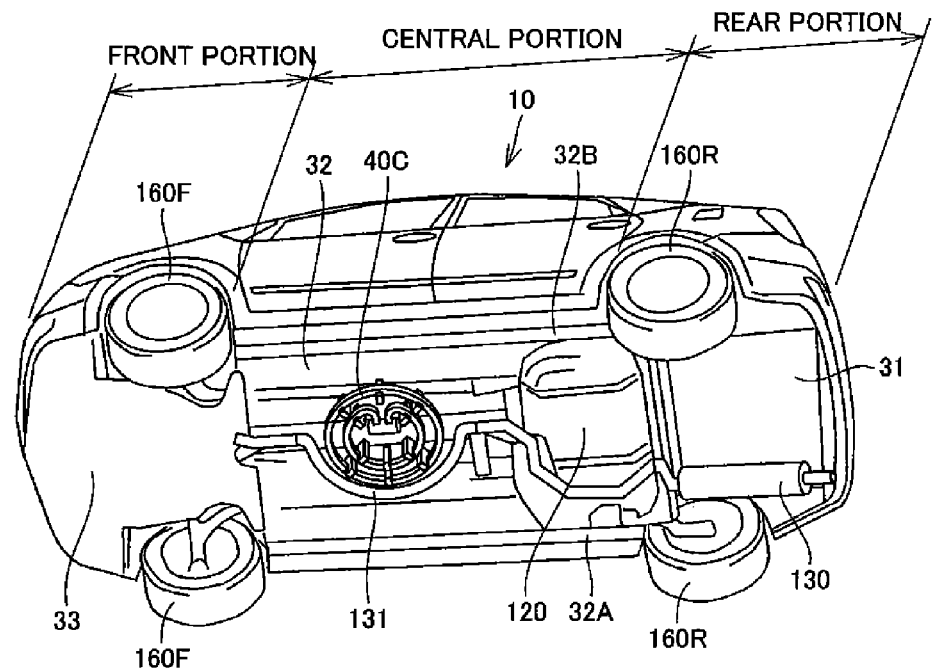
FIG. 14 is a bottom view of the vehicle showing a construction of an electric power reception device mounted on the vehicle in a second embodiment.
Figure 15:
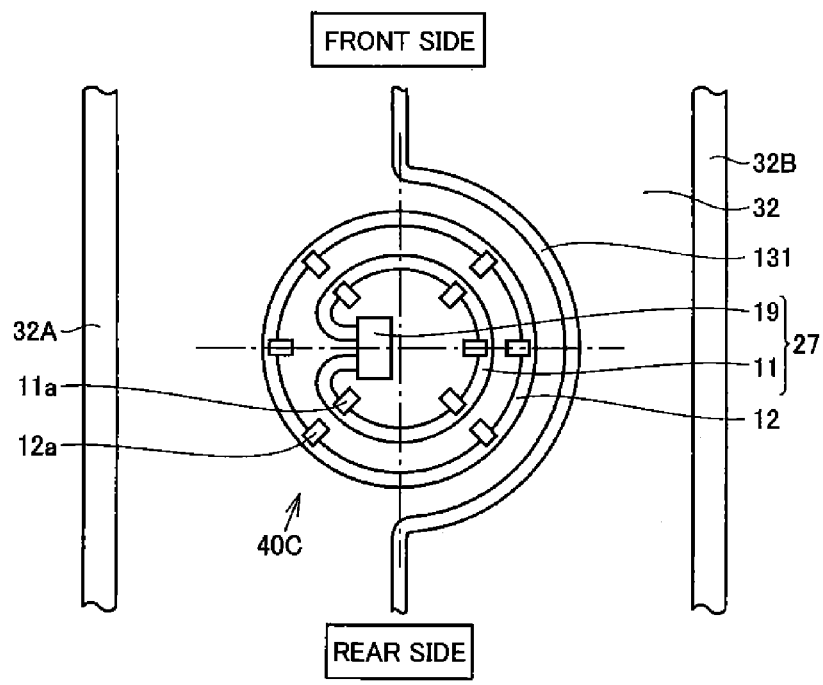
FIG. 15 is a plan view of a central portion of the vehicle showing a construction of the electric power reception device mounted on the vehicle in the second embodiment.
Figure 16:
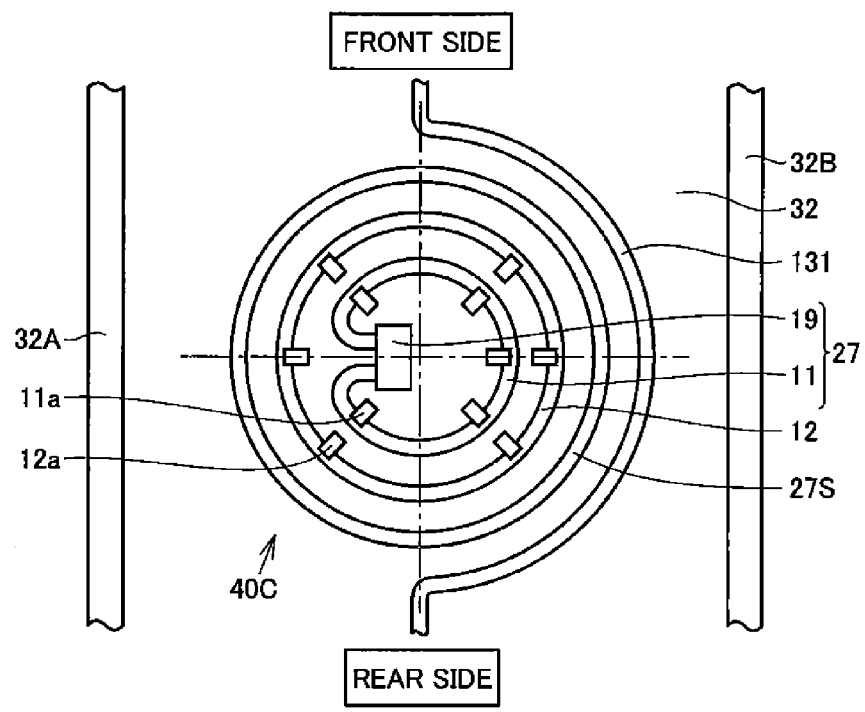
FIG. 16 is a plan view of the central portion of the vehicle showing another construction of the electric power reception device mounted on the vehicle in the second embodiment.
Figure 17:
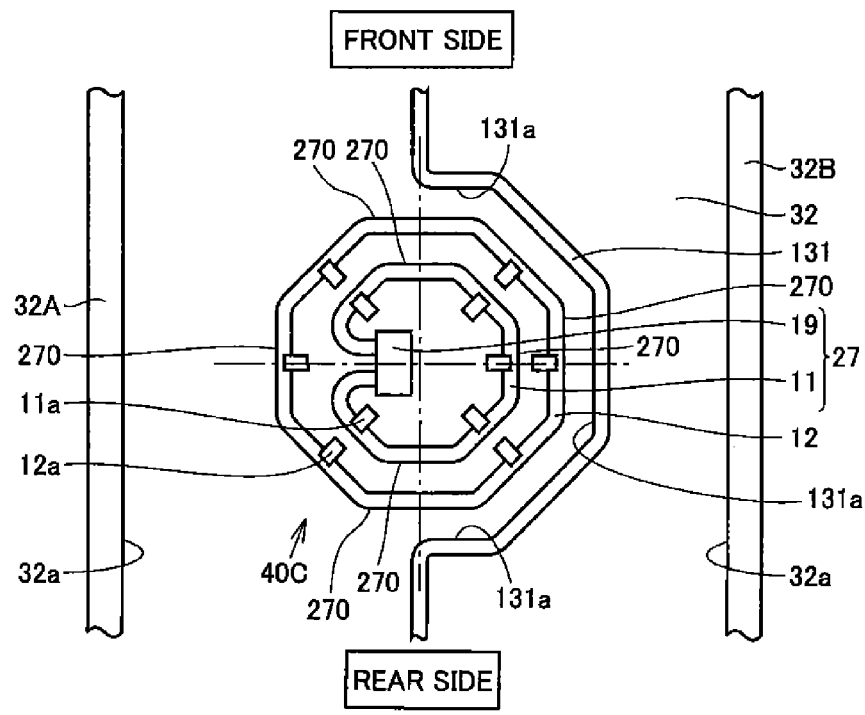
FIG. 17 is a plan view of the central portion of the vehicle showing yet another construction of the electric power reception device mounted on the vehicle in the second embodiment.
Figure 18:
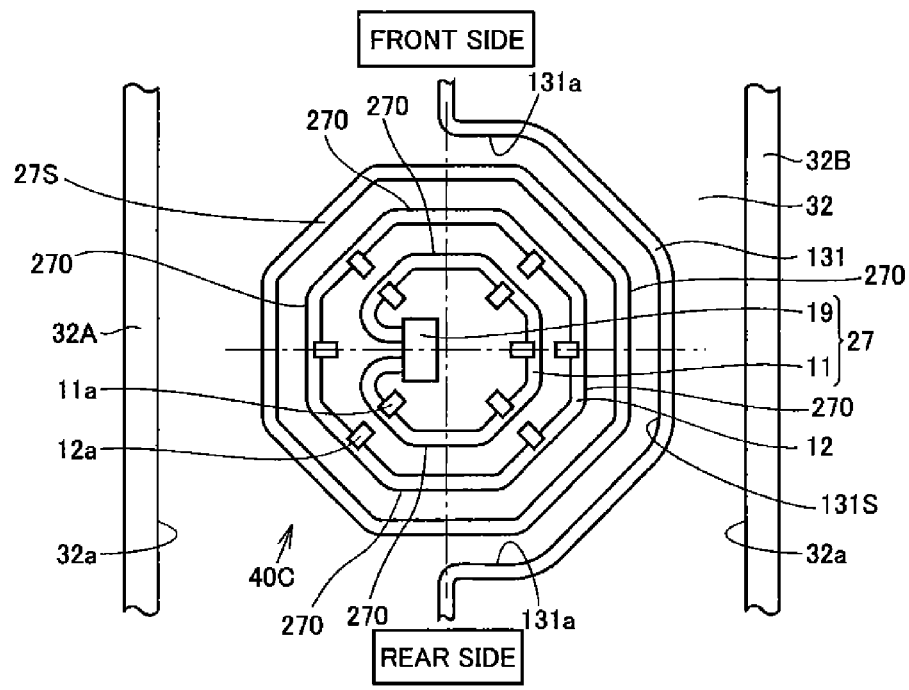
FIG. 18 is a plan view of the central portion of the vehicle showing yet another construction of the electric power reception device mounted on the vehicle in the second embodiment.

FIG. 14 is a bottom view of the electrically powered vehicle showing a construction of an electric power reception device 40C mounted on electrically powered vehicle 10 in the present embodiment, FIG. 15 is a plan view of the central portion of the vehicle showing a construction of electric power reception device 40C mounted on electrically powered vehicle 10 in the present embodiment, and FIGS. 16 to 18 are each a plan view of the central portion of the vehicle showing another construction of electric power reception device 40C mounted on electrically powered vehicle 10 in the present embodiment.

As shown in FIGS. 14 and 15, in electrically powered vehicle 10 in the present embodiment, electric power reception device 40C is arranged in the central portion of electrically powered vehicle 10. Electric power reception device 40C includes electric power reception portion 27 and annular electromagnetic induction coil 12. Electric power reception portion 27 has annular resonant coil 11 and capacitor 19.

Resonant coil 11 is fixed to a center floor panel 32 with the use of support member 11a made of resin. Electromagnetic induction coil 12 is fixed to center floor panel 32 with the use of support member 12a made of resin. Though electromagnetic induction coil 12 is arranged on the outer side of resonant coil 11 in the present embodiment, arrangement relation between resonant coil 11 and electromagnetic induction coil 12 is not limited to this arrangement relation.

As shown in FIG. 15, in the present embodiment, electric power reception device 40C and a plurality of vehicle-mounted components are mounted below center floor panel 32 forming a floor panel, and in addition, a plurality of vehicle-mounted components are arranged in a region (below) except for a side of electric power reception device 40C facing electric power transmission device 41 (see FIG. 1).

Specifically, exhaust pipe 131, side members 32A, 32B, fuel tank 120 (see FIG. 26), a fuel hose 123 (see FIG. 26), and a brake hose 181 (see FIG. 28) are arranged substantially flush with and around electric power reception device 40C.

Referring to FIG. 15, exhaust pipe 131 is arranged half around so as to surround an outer side in a direction of radius of electric power reception device 40C. In the figure, a right side of electric power reception device 40C is surrounded. In addition, side member 32A located on the left side and side member 32B located on the right side are provided to protrude downward from center floor panel 32 (see FIG. 24).

In the plurality of vehicle-mounted components described above, a metal material such as iron or aluminum is used for center floor panel 32 as well as exhaust pipe 131, side members 32A, 32B, fuel tank 120, fuel hose 123, and brake hose 181 which are the plurality of vehicle-mounted components described above.

These metal materials such as iron and aluminum have such a shielding effect that electromagnetic waves are converted to an eddy current when electromagnetic waves reach, however, preferably, a material lower in impedance than iron, aluminum, or the like is used such that, preferably, electromagnetic waves which have reached are efficiently converted to an eddy current and the shielding effect is enhanced.

Then, center floor panel 32 and the vehicle-mounted components above have at least a region (surface) facing electric power reception device 40C subjected to a shielding process, so that the vehicle-mounted components above preferably have a shielding function for cutting off leaked electromagnetic waves.

Shielding means a function to suppress advance of electromagnetic waves beyond a vehicle-mounted component when electromagnetic waves reach center floor panel 32 and the vehicle-mounted component, and specifically means suppression of advance of electromagnetic waves by conversion of electromagnetic waves which have reached to an eddy current. The region (surface) facing electric power reception device 40C means a region which electromagnetic waves directly or indirectly reach when electromagnetic waves are considered to radially be emitted from electric power reception device 40C.

It is noted that, when a material high in shielding effect (a material low in impedance) is originally used for the vehicle-mounted component above, it is not necessary to subject a surface of the vehicle-mounted component to a shielding process. A material high in shielding effect is the same as in the first embodiment above.

In FIG. 15, regarding specific regions of center floor panel 32 and a vehicle-mounted component to be subjected to a shielding process, bonding to the entire surface of center floor panel 32 (lower surface), exhaust pipe 131, side members 32A, 32B, fuel tank 120, fuel hose 123, and brake hose 181 is preferred, however, increase in cost is concerned.

Then, in center floor panel 32, exhaust pipe 131, side members 32A, 32B, fuel tank 120, fuel hose 123, and brake hose 181, at least a region (surface) facing electric power reception device 40C is preferably subjected to a shielding process. As described above, a region (surface) facing electric power reception device 40C means a region which electromagnetic waves directly or indirectly reach when electromagnetic waves are considered to radially be emitted from electric power reception device 40C.

Thus, since it is not necessary to separately provide a shielding member for shielding against electromagnetic waves which leak from electric power reception device 40C, electric power reception device 40C can efficiently be mounted in a limited space in electrically powered vehicle 10 while leakage of electromagnetic waves from electric power reception device 40C in a case that electric power reception device 40C is arranged in the central portion of electrically powered vehicle 10 is taken into account.

Consequently, a large area of electric power reception device 40C facing electric power transmission device 41 can be secured, and characteristics against position displacement from electric power transmission device 41 can be improved. Lowering in transmission efficiency can thus be suppressed.

In addition, cost can also be lowered by decreasing the number of parts. Moreover, reduction in size of electric power reception device 40C and reduction in size of electrically powered vehicle 10 can also be contemplated.

In the present embodiment, at least a part of resonant coil 11 of electric power reception portion 27 and a part of electromagnetic induction coil 12 are located between capacitor 19 adopted in electric power reception device 40C and exhaust pipe 131. A part of resonant coil 11 and a part of electromagnetic induction coil 12 being located between capacitor 19 and exhaust pipe 131 means such arrangement relation that, when capacitor 19 and exhaust pipe 131 are connected to each other with a straight line, a part of resonant coil 11 and a part of electromagnetic induction coil 12 cross that straight line.

Thus, influence on capacitor 19 by heat emitted from exhaust pipe 131 (variation in capacity based on temperature characteristics) can be avoided and stability of conduction efficiency in electric power reception device 40C can be maintained. It is noted that, when influence on capacitor 19 by heat emitted from exhaust pipe 131 does not give rise to a problem, a position of arrangement of capacitor 19 is not particularly restricted.

Another construction of electric power reception device 40C is shown with reference to FIG. 16. When there is a sufficient room in a space in a central region of electrically powered vehicle 10, shielding member 27S can also be provided so as to surround the outer side in the direction of radius of electric power reception device 40C as shown in FIG. 16. A construction and a function and effect of shielding member 27S are the same as in the forms shown in FIGS. 9 to 11 described above.

Yet another construction of electric power reception device 40C is shown with reference to FIG. 17. In the construction shown in FIG. 15, a case that annular resonant coil 11 and annular electromagnetic induction coil 12 are adopted in electric power reception device 40C has been shown. Resonant coil 11 and electromagnetic induction coil 12 shown in FIG. 17 each have a regular octagonal shape.

By adopting a coil shape of a regular octagonal shape for resonant coil 11 and electromagnetic induction coil 12, as in the construction shown in FIG. 12, it becomes easy to avoid interference with a vehicle-mounted component, and electric power reception device 40C can efficiently be mounted in the central region of electrically powered vehicle 10.

In addition, by adopting a coil shape of a regular octagonal shape, straight portion 270 is created in each of resonant coil 11 and electromagnetic induction coil 12. In vehicle-mounted components, a straight portion 131a is present in exhaust pipe 131 and a straight portion 32a is present in side member 32A, 32B.

Electric power reception device 40C is arranged such that straight portions 32a of these vehicle-mounted components and straight portions 270 of resonant coil 11 and electromagnetic induction coil 12 are in parallel. In a region where they are arranged in parallel, the vehicle-mounted components and resonant coil 11 and electromagnetic induction coil 12 are arranged such that a distance therebetween is constant.

Thus, since resonant coil 11 and electromagnetic induction coil 12 on a side facing the vehicle-mounted components have a region arranged at a constant distance from each vehicle-mounted component, a large space for mounting resonant coil 11 and electromagnetic induction coil 12 can be secured while interference with the vehicle-mounted components is avoided. Therefore, a coil having a greater outer diameter can be mounted and electric power reception device 40C capable of transmitting high electric power can be mounted.

In addition, as in the present embodiment, resonant coil 11 and electromagnetic induction coil 12 each have a regular polygonal shape having region 270 arranged at a constant distance as one side, so that resonant coil 11 and electromagnetic induction coil 12 can be mounted while interference with a vehicle-mounted component is avoided and characteristics against position displacement can be made uniform by employing a coil shape of a regular polygonal shape.

It is noted that a coil shape is not limited to a regular octagonal shape. Straight portion 270 with which a distance between a vehicle-mounted component and electric power reception device 40C is constant should only be present in a coil, with respect to the straight portion of the vehicle-mounted component. Therefore, a polygonal shape or combination of a straight shape and a curved shape is acceptable.

A region where a vehicle-mounted component and electric power reception device 40C are arranged at a constant distance from each other is not limited to straight lines but it may be curved surfaces. For example, the features shown in FIGS. 15 and 17 may be combined, a curved region may be provided on a side where exhaust pipe 131 is arranged, and a straight portion may be provided on a side opposite to exhaust pipe 131.

Another construction of electric power reception device 40C is shown with reference to FIG. 18. When there is a sufficient room in a space in the central region of electrically powered vehicle 10, shielding member 27S can also be provided so as to surround the outer side of electric power reception device 40C as shown in FIG. 18. Since shielding member 27S has a regular octagonal form, resonant coil 11 and electromagnetic induction coil 12 also have a regular octagonal shape in conformity with an outer geometry of shielding member 27S. For a structure of shielding member 27S, a structure similar to that of shielding member 27S shown in FIGS. 9 to 11 can be adopted.

With this construction as well, regarding provision of shielding member 27S, an interval between resonant coil 11 and electromagnetic induction coil 12, and shielding member 27S becomes constant. Thus, permeability between shielding member 27S, and resonant coil 11 and electromagnetic induction coil 12 can readily be known and system design can be facilitated.

Regarding adoption of a polygonal shape, by adopting a coil shape of a regular octagonal shape for resonant coil 11 and electromagnetic induction coil 12, it becomes easy to avoid interference with a vehicle-mounted component, and electric power reception device 40C can efficiently be mounted in the central region of electrically powered vehicle 10.

In addition, by adopting a coil shape of a regular octagonal shape, straight portion 270 is created in each of resonant coil 11 and electromagnetic induction coil 12. In vehicle-mounted components, straight portion 131a is present in exhaust pipe 131 and straight portion 32a is present in side member 32A, 32B.

Electric power reception device 40C is arranged such that straight portions 32a of these vehicle-mounted components and straight portions 270 of resonant coil 11 and electromagnetic induction coil 12 are in parallel. In a region where they are arranged in parallel, the vehicle-mounted components, and resonant coil 11 and electromagnetic induction coil 12 are arranged such that a distance therebetween is constant.

Thus, since resonant coil 11 and electromagnetic induction coil 12 on a side facing the vehicle-mounted components have a region arranged at a constant distance from each vehicle-mounted component, a large space for mounting resonant coil 11 and electromagnetic induction coil 12 can be secured while interference with the vehicle-mounted components is avoided. Therefore, a coil having a greater outer diameter can be mounted and electric power reception device 40C capable of transmitting high electric power can be mounted.

In addition, as in the present embodiment, resonant coil 11 and electromagnetic induction coil 12 each have a regular polygonal shape having region 270 arranged at a constant distance as one side, so that resonant coil 11 and electromagnetic induction coil 12 can be mounted while interference with a vehicle-mounted component is avoided and characteristics against position displacement can be made uniform by employing a coil shape of a regular polygonal shape.

Other functions and effects in provision of shielding member 27S and adoption of a polygonal shape are the same as in the constructions shown in FIGS. 9 to 11.

Third Embodiment

The vehicle incorporating the electric power transmission system according to the present embodiment will now be described with reference to FIGS. 19 to 23. It is noted that difference from the first embodiment described above is a position where the electric power reception portion is mounted on electrically powered vehicle 10, and therefore, only the difference will be described below in detail.

Figure 19:
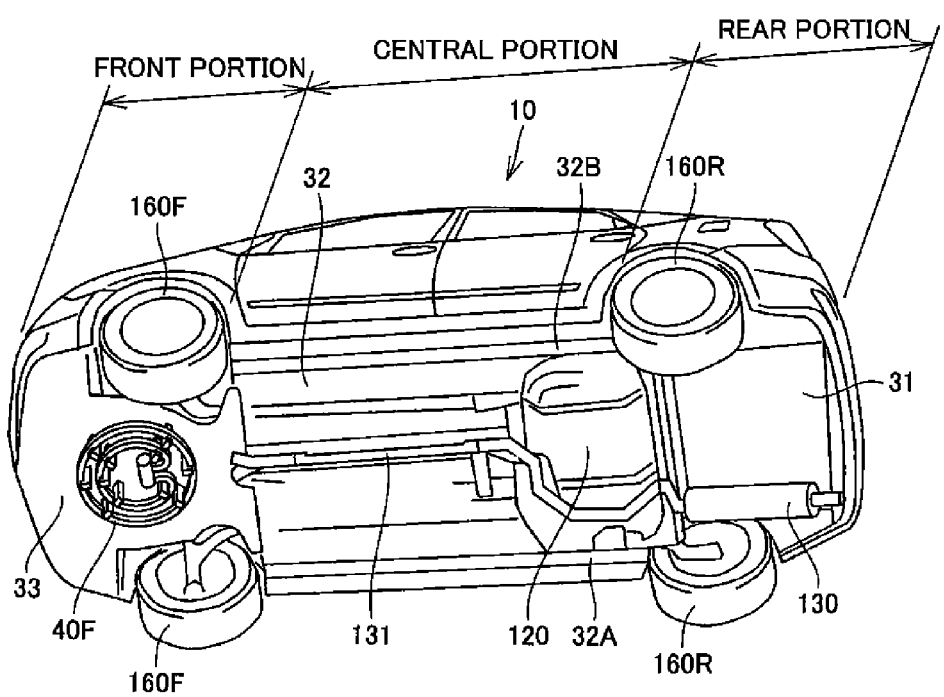
FIG. 19 is a bottom view of the vehicle showing a construction of an electric power reception device mounted on the vehicle in a third embodiment.
Figure 20:
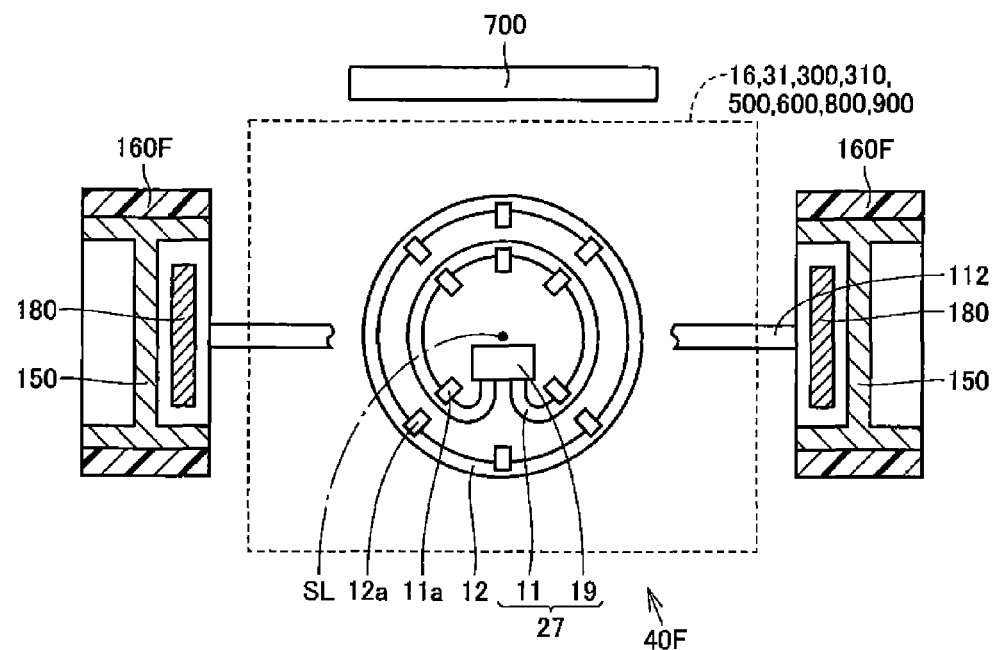
FIG. 20 is a plan view of a front portion of the vehicle showing a construction of the electric power reception device mounted on the vehicle in the third embodiment.
Figure 21:
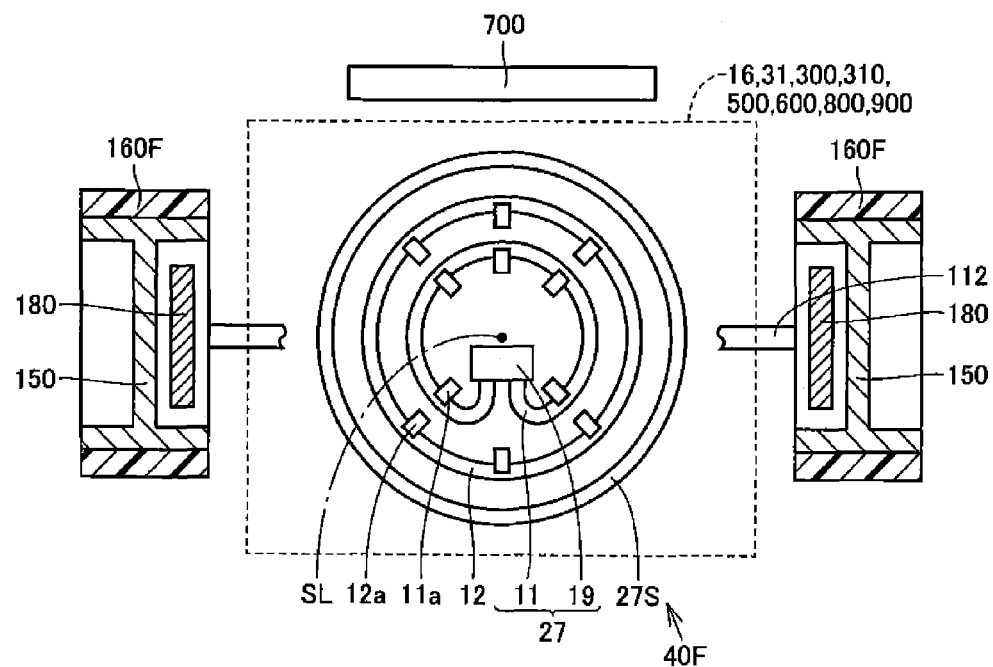
FIG. 21 is a plan view of the front portion of the vehicle showing another construction of the electric power reception device mounted on the vehicle in the third embodiment.
Figure 22:
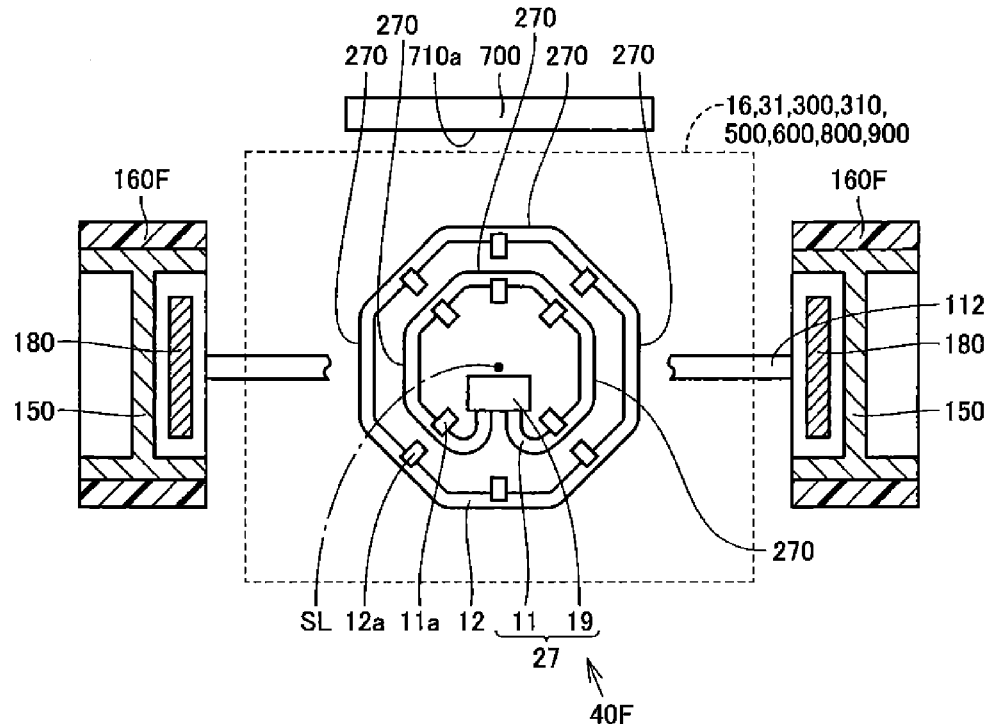
FIG. 22 is a plan view of the front portion of the vehicle showing yet another construction of the electric power reception device mounted on the vehicle in the third embodiment.
Figure 23:
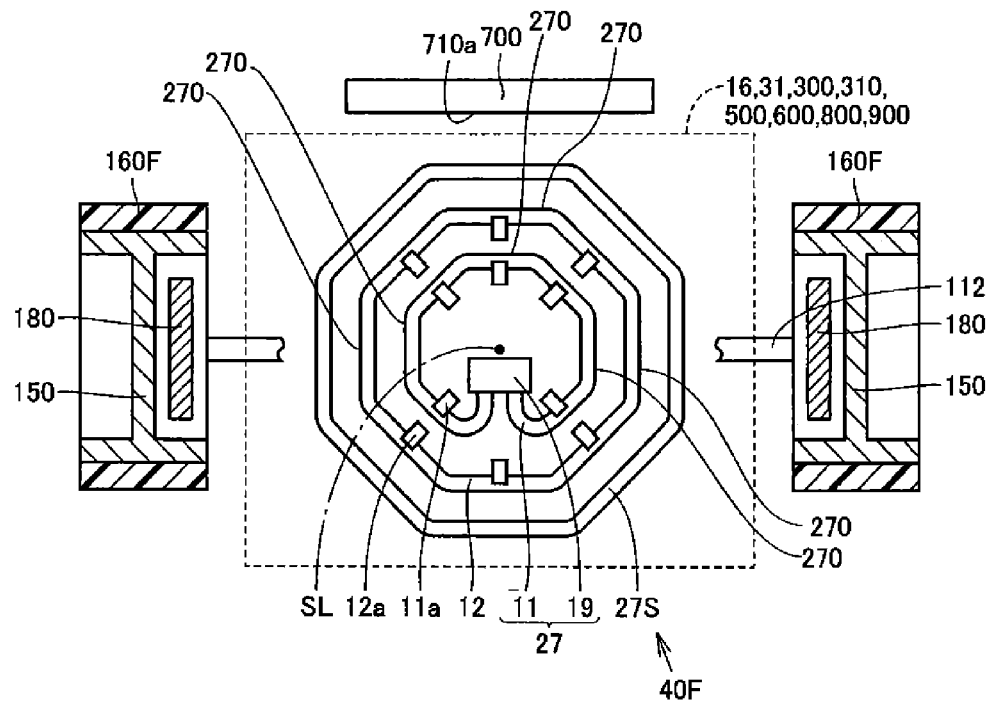
FIG. 23 is a plan view of the front portion of the vehicle showing yet another construction of the electric power reception device mounted on the vehicle in the third embodiment.

FIG. 19 is a bottom view of the electrically powered vehicle showing a construction of an electric power reception device 40F mounted on electrically powered vehicle 10 in the present embodiment, FIG. 20 is a plan view of the front portion of the vehicle showing a construction of electric power reception device 40F mounted on electrically powered vehicle 10 in the present embodiment, and FIGS. 21 to 23 are each a plan view of the front portion of the vehicle showing another construction of electric power reception device 40F mounted on the vehicle in the present embodiment.

As shown in FIGS. 19 and 20, in electrically powered vehicle 10 in the present embodiment, electric power reception device 40F is arranged in the front portion of electrically powered vehicle 10. Electric power reception device 40F includes electric power reception portion 27 and annular electromagnetic induction coil 12. Electric power reception portion 27 has annular resonant coil 11 and capacitor 19.

Resonant coil 11 is fixed to a floor panel 33 which is provided under engine with the use of support member 11a made of resin. Electromagnetic induction coil 12 is fixed to floor panel under engine 33 with the use of support member 12a made of resin. Though electromagnetic induction coil 12 is arranged on the outer side of resonant coil 11 in the present embodiment, arrangement relation between resonant coil 11 and electromagnetic induction coil 12 is not limited to this arrangement relation.

As shown in FIG. 19, in the present embodiment, electric power reception device 40F and a plurality of vehicle-mounted components are mounted below floor panel under engine 33 forming a floor panel, and in addition, a plurality of vehicle-mounted components are arranged in a region (below) except for a side of electric power reception device 40F facing electric power transmission device 41 (see FIG. 1).

Specifically, a front suspension 112, tire wheel 150, brake 180, brake hose 181 (see FIG. 28), and a radiator 700 (see FIG. 29) are arranged substantially flush with and around electric power reception device 40.

In the plurality of vehicle-mounted components described above, a metal material such as iron or aluminum is used for floor panel under engine 33 as well as front suspension 112, tire wheel 150, brake 180, brake hose 181, and radiator 700 which are the plurality of vehicle-mounted components described above.

These metal materials such as iron and aluminum have such a shielding effect that electromagnetic waves are converted to an eddy current when electromagnetic waves reach, however, preferably, a material lower in impedance than iron, aluminum, or the like is used such that, preferably, electromagnetic waves which have reached are efficiently converted to an eddy current and the shielding effect is enhanced.

Then, floor panel under engine 33 and the vehicle-mounted components above have at least a region (surface) facing electric power reception device 40F subjected to a shielding process, so that the vehicle-mounted components above preferably have a shielding function for cutting off leaked electromagnetic waves.

Shielding means a function to suppress advance of electromagnetic waves beyond a vehicle-mounted component when electromagnetic waves reach floor panel under engine 33 and the vehicle-mounted component, and specifically means suppression of advance of electromagnetic waves by conversion of electromagnetic waves which have reached to an eddy current. The region (surface) facing electric power reception device 40F means a region which electromagnetic waves directly or indirectly reach when electromagnetic waves are considered to radially be emitted from electric power reception device 40F.

It is noted that, when a material high in shielding effect (a material low in impedance) is originally used for the vehicle-mounted component above, it is not necessary to subject a surface of the vehicle-mounted component to a shielding process. A material high in shielding effect is the same as in the first embodiment above.

In FIG. 20, regarding specific regions of floor panel under engine 33 and a vehicle-mounted component to be subjected to a shielding process, bonding to the entire surface of floor panel under engine 33 (lower surface), front suspension 112, tire wheel 150, brake 180, brake hose 181, and radiator 700 is preferred, however, increase in cost is concerned.

Then, in floor panel under engine 33, front suspension 112, tire wheel 150, brake 180, brake hose 181, and radiator 700, at least a region (surface) facing electric power reception device 40F is preferably subjected to a shielding process. As described above, a region (surface) facing electric power reception device 40F means a region which electromagnetic waves directly or indirectly reach when electromagnetic waves are considered to radially be emitted from electric power reception device 40F.

Thus, since it is not necessary to separately provide a shielding member for shielding against electromagnetic waves which leak from electric power reception device 40F, electric power reception device 40F can efficiently be mounted in a limited space in electrically powered vehicle 10 while leakage of electromagnetic waves from electric power reception device 40F in a case that electric power reception device 40F is arranged in the front portion of electrically powered vehicle 10 is taken into account.

Consequently, a large area of electric power reception device 40F facing electric power transmission device 41 can be secured, and characteristics against position displacement from electric power transmission device 41 can be improved. Lowering in transmission efficiency can thus be suppressed.

In addition, cost can also be lowered by decreasing the number of parts. Moreover, reduction in size of electric power reception device 40F and reduction in size of electrically powered vehicle 10 can also be contemplated.

Another construction of electric power reception device 40F is shown with reference to FIG. 21. When there is a sufficient room in a space in a front region of electrically powered vehicle 10, shielding member 27S can also be provided so as to surround an outer side in a direction of radius of electric power reception device 40F as shown in FIG. 21. A construction and a function and effect of shielding member 27S are the same as in the forms shown in FIGS. 9 to 11 described above.

Yet another construction of electric power reception device 40F is shown with reference to FIG. 22. In the construction shown in FIG. 20, a case that annular resonant coil 11 and annular electromagnetic induction coil 12 are adopted in electric power reception device 40F has been shown. Resonant coil 11 and electromagnetic induction coil 12 shown in FIG. 22 each have a regular octagonal shape.

By adopting a coil shape of a regular octagonal shape for resonant coil 11 and electromagnetic induction coil 12, as in the construction shown in FIG. 12, it becomes easy to avoid interference with a vehicle-mounted component, and electric power reception device 40F can efficiently be mounted in front and rear regions of electrically powered vehicle 10.

In addition, by adopting a coil shape of a regular octagonal shape, straight portion 270 is created in resonant coil 11 and electromagnetic induction coil 12. In a vehicle-mounted component, a straight portion 710a is present in radiator 700.

Electric power reception device 40F is arranged such that straight portion 710a of the vehicle-mounted component and straight portions 270 of resonant coil 11 and electromagnetic induction coil 12 are in parallel. In a region where they are arranged in parallel, the vehicle-mounted component and resonant coil 11 and electromagnetic induction coil 12 are arranged such that a distance therebetween is constant.

Thus, since resonant coil 11 and electromagnetic induction coil 12 on a side facing the vehicle-mounted component have a region arranged at a constant distance from each vehicle-mounted component, a large space for mounting resonant coil 11 and electromagnetic induction coil 12 can be secured while interference with the vehicle-mounted component is avoided. Therefore, a coil having a greater outer diameter can be mounted and electric power reception device 40F capable of transmitting high electric power can be mounted.

In addition, as in the present embodiment, resonant coil 11 and electromagnetic induction coil 12 each have a regular polygonal shape having region 270 arranged at a constant distance as one side, so that resonant coil 11 and electromagnetic induction coil 12 can be mounted while interference with a vehicle-mounted component is avoided and characteristics against position displacement can be made uniform by employing a coil shape of a regular polygonal shape.

It is noted that a coil shape is not limited to a regular octagonal shape. Straight portion 270 with which a distance between a vehicle-mounted component and electric power reception device 40 is constant should only be present in a coil, with respect to the straight portion of the vehicle-mounted component. Therefore, a polygonal shape or combination of a straight shape and a curved shape is acceptable.

A region where a vehicle-mounted component and electric power reception device 40F are arranged at a constant distance from each other is not limited to straight lines but it may be curved surfaces.

Another construction of electric power reception device 40F is shown with reference to FIG. 23. When there is a sufficient room in a space in the front region of electrically powered vehicle 10, shielding member 27S can also be provided so as to surround the outer side of electric power reception device 40F as shown in FIG. 23. Since shielding member 27S has a regular octagonal form, resonant coil 11 and electromagnetic induction coil 12 also have a regular octagonal shape in conformity with an outer geometry of shielding member 27S. For a structure of shielding member 27S, a structure similar to that of shielding member 27S shown in FIGS. 9 to 11 can be adopted.

With this construction as well, regarding provision of shielding member 27S, an interval between resonant coil 11 and electromagnetic induction coil 12, and shielding member 27S becomes constant. Thus, permeability between shielding member 27S, and resonant coil 11 and electromagnetic induction coil 12 can readily be known and system design can be facilitated.

Regarding adoption of a polygonal shape, by adopting a coil shape of a regular octagonal shape for resonant coil 11 and electromagnetic induction coil 12, it becomes easy to avoid interference with a vehicle-mounted component, and electric power reception device 40C can efficiently be mounted in the central region of electrically powered vehicle 10.

In addition, by adopting a coil shape of a regular octagonal shape, straight portion 270 is created in each of resonant coil 11 and electromagnetic induction coil 12. In a vehicle-mounted component, straight portion 710a is present in radiator 700.

Electric power reception device 40F is arranged such that straight portion 710a of the vehicle-mounted component and straight portions 270 of resonant coil 11 and electromagnetic induction coil 12 are in parallel. In a region where they are arranged in parallel, the vehicle-mounted component and resonant coil 11 and electromagnetic induction coil 12 are arranged such that a distance therebetween is constant.

Thus, since resonant coil 11 and electromagnetic induction coil 12 on a side facing the vehicle-mounted component have a region arranged at a constant distance from each vehicle-mounted component, a large space for mounting resonant coil 11 and electromagnetic induction coil 12 can be secured while interference with the vehicle-mounted component is avoided. Therefore, a coil having a greater outer diameter can be mounted and electric power reception device 40 capable of transmitting high electric power can be mounted.

In addition, as in the present embodiment, resonant coil 11 and electromagnetic induction coil 12 each have a regular polygonal shape having region 270 arranged at a constant distance as one side, so that resonant coil 11 and electromagnetic induction coil 12 can be mounted while interference with a vehicle-mounted component is avoided and characteristics against position displacement can be made uniform by employing a coil shape of a regular polygonal shape.

Other functions and effects in provision of shielding member 27S and adoption of a polygonal shape are the same as in the constructions shown in FIGS. 9 to 11.

In addition, in the embodiment described above, an annular shape and a regular octagonal shape are adopted as a form of shielding member 27S and a shape in conformity with an outer geometry of shielding member 27S is also adopted for a shape of resonant coil 11 and electromagnetic induction coil 12, however, limitation to this form is not intended. Shielding member 27S can be formed in a polygonal shape such as a quadrangular shape, a pentagonal shape, and a heptagonal shape so long as a shape can effectively ensure a space for mounting an electric power reception device in accordance with a state of arrangement of vehicle-mounted components.

Moreover, an outer geometrical shape of an electric power reception device arranged on an inner side of shielding member 27S can also be formed to have a shape in conformity with an outer geometry of shielding member 27S. It is noted that an outer geometrical shape of the electric power reception device includes not only an outer geometrical shape formed by a shape of a coil (how the coil is wound) but also a case that an outer geometrical shape of an electric power reception device is shaped, for example, by a shape defined by a shape of the entirety including a coil core around which resonant coil 11 is wound.

Therefore, a structure having a region arranged at a constant distance between the shape of the entirety including a coil core and a shielding member can also be adopted.

(Vehicle-Mounted Component)

Arrangement relation between electric power reception device 40 mounted in the rear portion, electric power reception device 40C mounted in the central portion, and electric power reception device 40F mounted in the front portion in each embodiment above, and a vehicle-mounted component mounted on electrically powered vehicle 10 will now be described with reference to FIGS. 24 to 30. For the sake of convenience of illustration, FIGS. 27 to 29 simultaneously illustrate electric power reception devices 40, 40C, 40F in respective embodiments.

Figure 24:
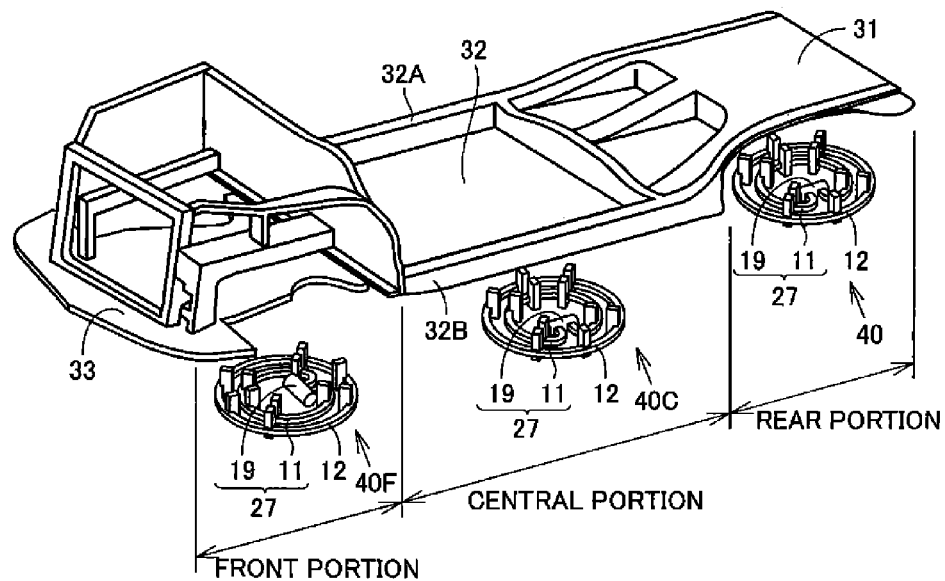
FIG. 24 is a schematic diagram showing arrangement relation between a rear floor panel and a side member which are vehicle-mounted components and the electric power reception device in each embodiment.

FIG. 24 is a schematic diagram showing arrangement relation between rear floor panel 31, center floor panel 32, side members 32A, 32B, and floor panel under engine 33 which are vehicle-mounted components and electric power reception portion 27, 27C, 27F in each embodiment. In the first embodiment, electric power reception device 40 is mounted below rear floor panel 31 in the region in the rear portion of electrically powered vehicle 10. In the second embodiment, electric power reception device 40C is mounted below center floor panel 32 in the region in the central portion of electrically powered vehicle 10. In the third embodiment, electric power reception device 40F is mounted below floor panel under engine 33 in the region in the front portion of electrically powered vehicle 10.

Figure 25:
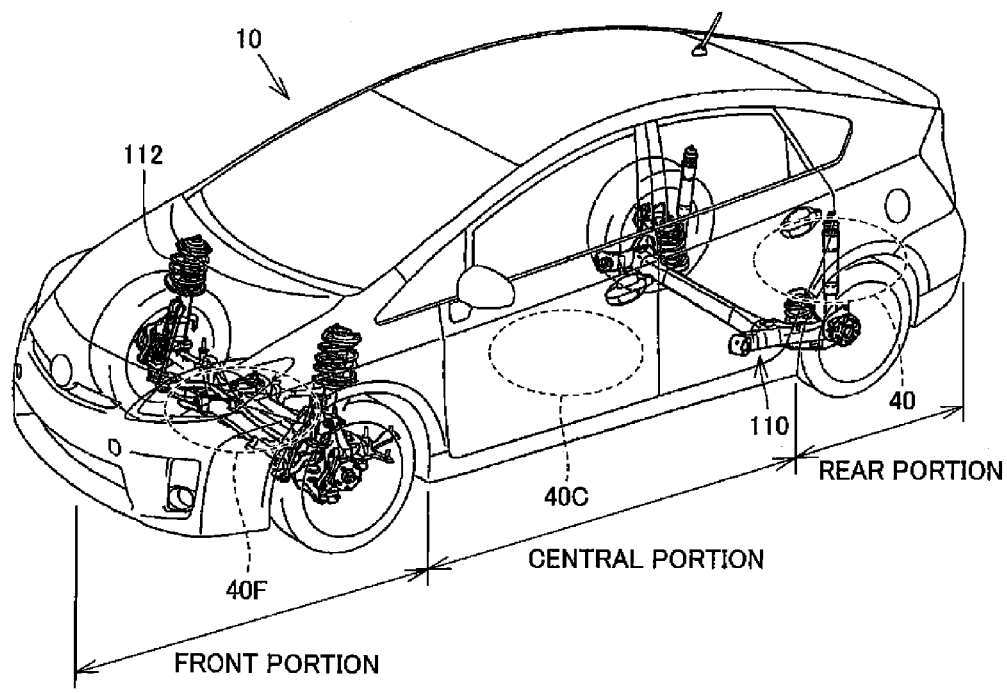
FIG. 25 is a schematic diagram showing arrangement relation between a rear suspension and a front suspension which are vehicle-mounted components and the electric power reception device in each embodiment.

FIG. 25 is a schematic diagram showing rear suspension 110 and front suspension 112 which are vehicle-mounted components and electric power reception device 40, 40C, 40F in each embodiment. In the first embodiment, electric power reception device 40 is mounted in the rear of rear suspension 110 in the region in the rear portion of electrically powered vehicle 10. In the second embodiment, electric power reception device 40C is mounted in a region between rear suspension 110 and front suspension 112 in the region in the central portion of the electrically powered vehicle. In the third embodiment, electric power reception device 40F is mounted below front suspension 112 in the region in the front portion of electrically powered vehicle 10.

Figure 26:
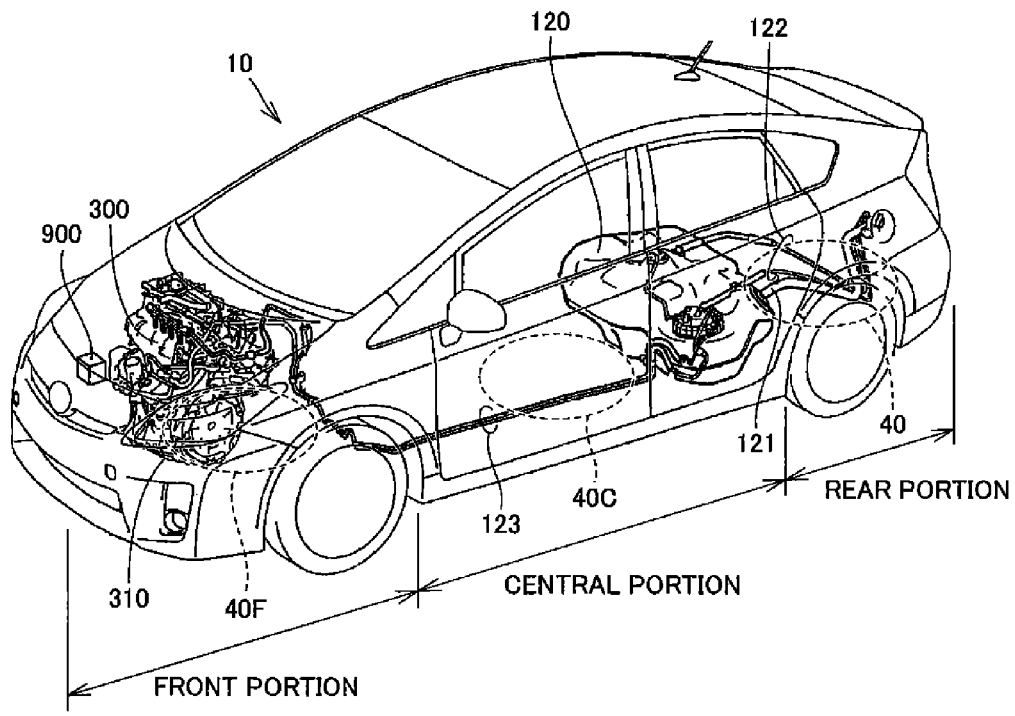
FIG. 26 is a schematic diagram showing arrangement relation between a fuel tank, a fuel hose, an engine, an oil pan, and a window washer tank which are vehicle-mounted components and the electric power reception device in each embodiment.

FIG. 26 is a schematic diagram showing arrangement relation between electric power reception device 40, 40C, 40F in each embodiment and fuel tank 120, fuel hoses 121, 122, 123, an engine 300, an oil pan 310, and a window washer tank 900 which are vehicle-mounted components.

In the first embodiment, electric power reception device 40 is mounted in the rear of fuel tank 120 and on the right of fuel hoses 121, 122 in the region in the rear portion of the electrically powered vehicle. In the second embodiment, electric power reception device 40C is mounted below fuel hose 123 in the region in the central portion of the electrically powered vehicle. In the third embodiment, electric power reception device 40F is mounted below engine 300, oil pan 310, and window washer tank 900 in the region in the front portion of electrically powered vehicle 10.

Figure 27:
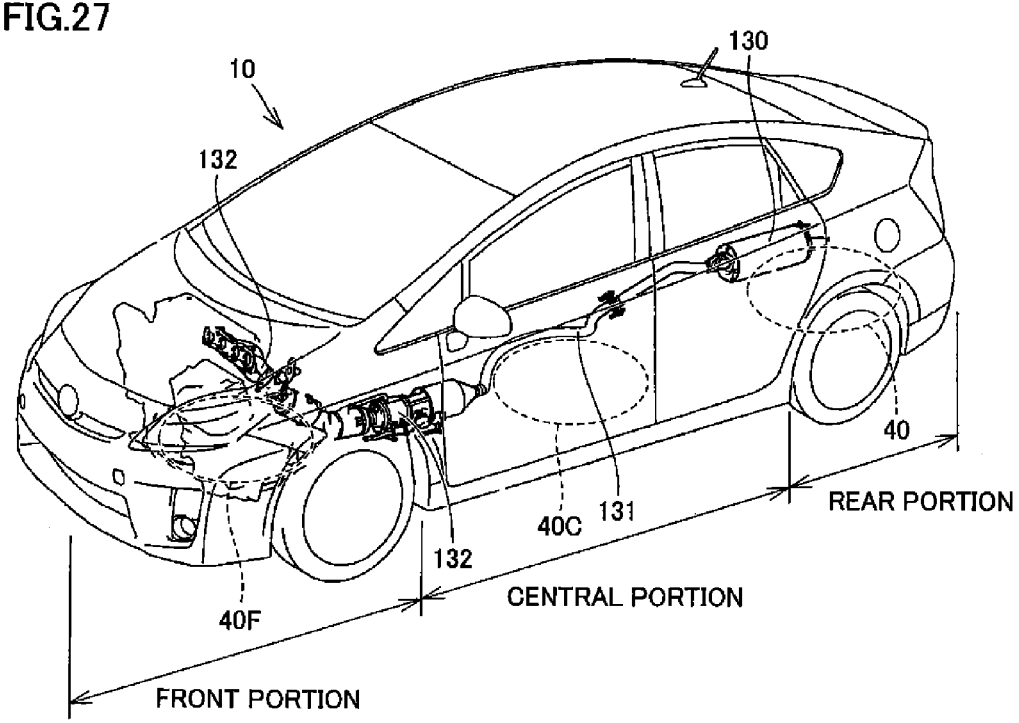
FIG. 27 is a schematic diagram showing arrangement relation between a muffler and an exhaust pipe which are vehicle-mounted components and the electric power reception device in each embodiment.

FIG. 27 is a schematic diagram showing arrangement relation between muffler 130 and exhaust pipes 131, 132 which are vehicle-mounted components and electric power reception device 40, 40C, 40F in each embodiment. In the first embodiment, electric power reception device 40 is mounted on the left of muffler 130 and exhaust pipe 131 in the region in the rear portion of the electrically powered vehicle. In the second embodiment, exhaust pipe 131 is mounted so as to surround electric power reception device 40C in the region in the central portion of the electrically powered vehicle. In the third embodiment, electric power reception device 40F is mounted below exhaust pipe 132 in the region in the front portion of electrically powered vehicle 10.

Figure 28:
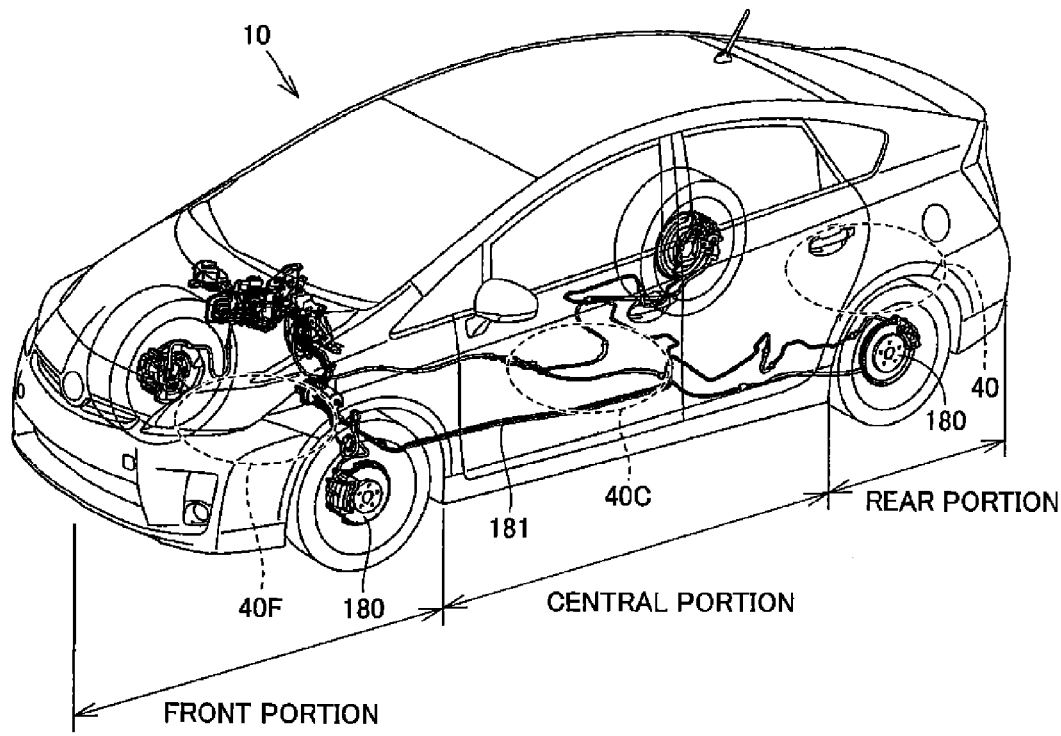
FIG. 28 is a schematic diagram showing arrangement relation between a brake which is a vehicle-mounted component and the electric power reception device in each embodiment.

FIG. 28 is a schematic diagram showing arrangement relation between brake 180 and brake hose 181 which are vehicle-mounted components and electric power reception device 40, 40C, 40F in each embodiment. In the first embodiment, electric power reception device 40 is mounted between brake 180 provided at a left rear wheel and brake 180 provided at a right rear wheel in the region in the rear portion of the electrically powered vehicle. In the second embodiment, electric power reception device 40C is mounted below brake hose 181 in the region in the central portion of the electrically powered vehicle. In the third embodiment, electric power reception device 40F is mounted between brake 180 provided at a left front wheel and brake 180 provided at a right front wheel in the region in the front portion of electrically powered vehicle 10.

Figure 29:
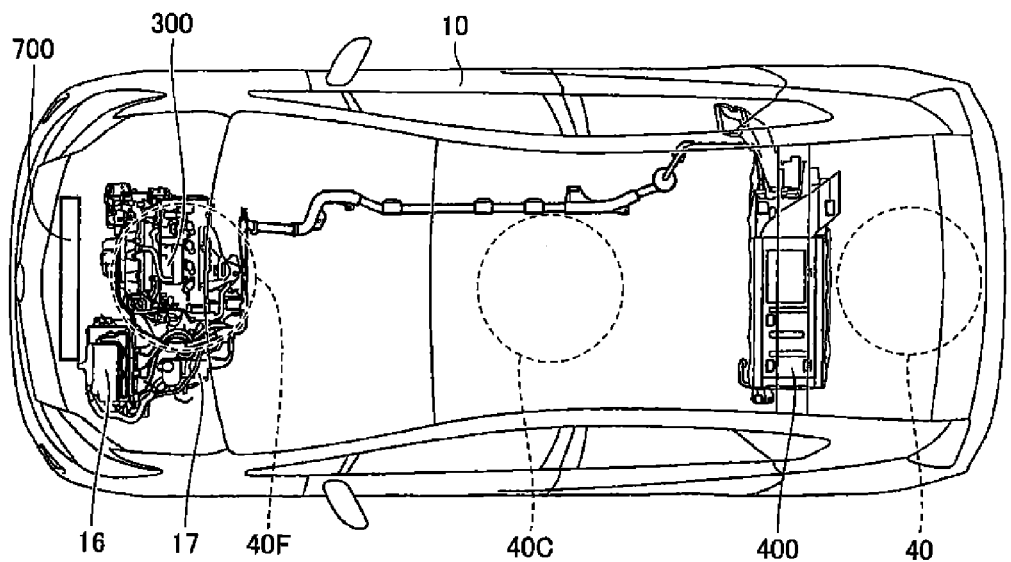
FIG. 29 is a schematic diagram showing arrangement relation between a radiator, the engine, a motor unit, a power control unit, and a battery which are vehicle-mounted components and the electric power reception device in each embodiment.

FIG. 29 is a schematic diagram showing arrangement relation between radiator 700, engine 300, motor unit 17, power control unit 16, and a battery 400 which are vehicle-mounted components and electric power reception device 40, 40C, 40F in each embodiment. In the first embodiment, electric power reception device 40 is mounted in the rear of battery 400 in the region in the rear portion of the electrically powered vehicle. In the second embodiment, electric power reception device 40C is mounted between battery 400 and engine 300 in the region in the central portion of the electrically powered vehicle. In the third embodiment, electric power reception device 40F is mounted in the rear of radiator 700 and below engine 300, motor unit 17, and power control unit 16 in the region in the front portion of electrically powered vehicle 10.

Figure 30:
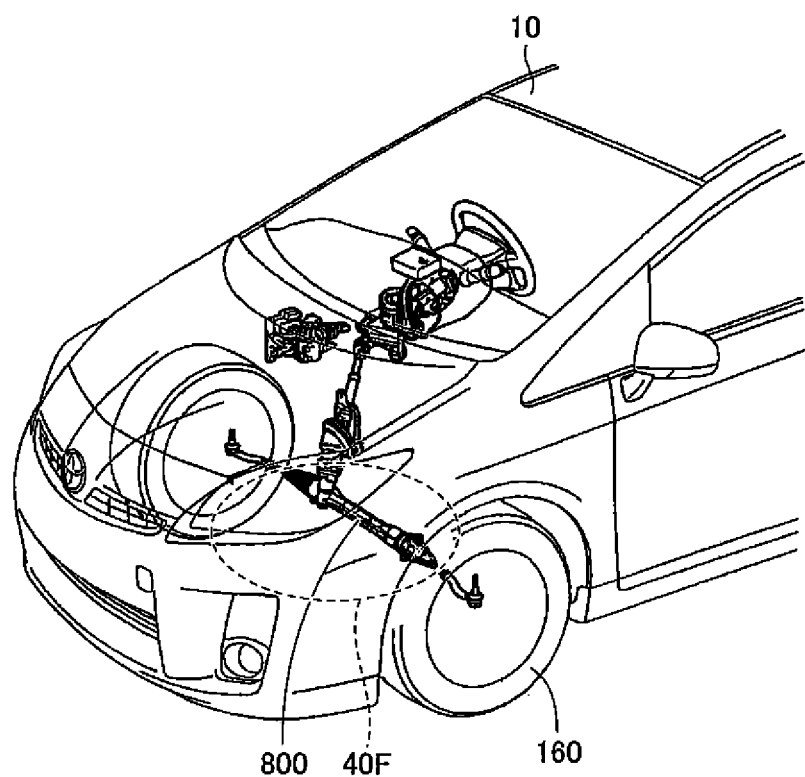
FIG. 30 is a schematic diagram showing arrangement relation between a steering mechanism which is a vehicle-mounted component and the electric power reception device in the third embodiment.

FIG. 30 is a schematic diagram showing arrangement relation between a steering mechanism 800 which is a vehicle-mounted component and electric power reception device 40F in the third embodiment. In the third embodiment, electric power reception device 40F is mounted below steering mechanism 800 in the region in the front portion of electrically powered vehicle 10.

As above, according to the vehicle and the electric power transmission system in each embodiment based on the present invention, electric power reception portion 40, 40C, 40F can efficiently be mounted in a limited space in electrically powered vehicle 10 in consideration of leakage of electromagnetic waves from electric power reception device 40, 40C, 40F in a case that electric power reception device 40, 40C, 40F is mounted on electrically powered vehicle 10.

Though an electric power reception device and an electric power transmission device including electromagnetic induction coils 12, 23, respectively, have been exemplified in each embodiment above, the present invention is applicable also to a resonant type non-contact electric power transmission and reception device including no electromagnetic induction coil.

Specifically, no electromagnetic induction coil 23 is provided on the electric power transmission device 41 side and a power supply portion (AC power supply 21, high-frequency driver 22) may directly be connected to resonant coil 24. On the electric power reception device 40 side, no electromagnetic induction coil 12 is provided and rectifier 13 may directly be connected to resonant coil 11.

Figure 31:
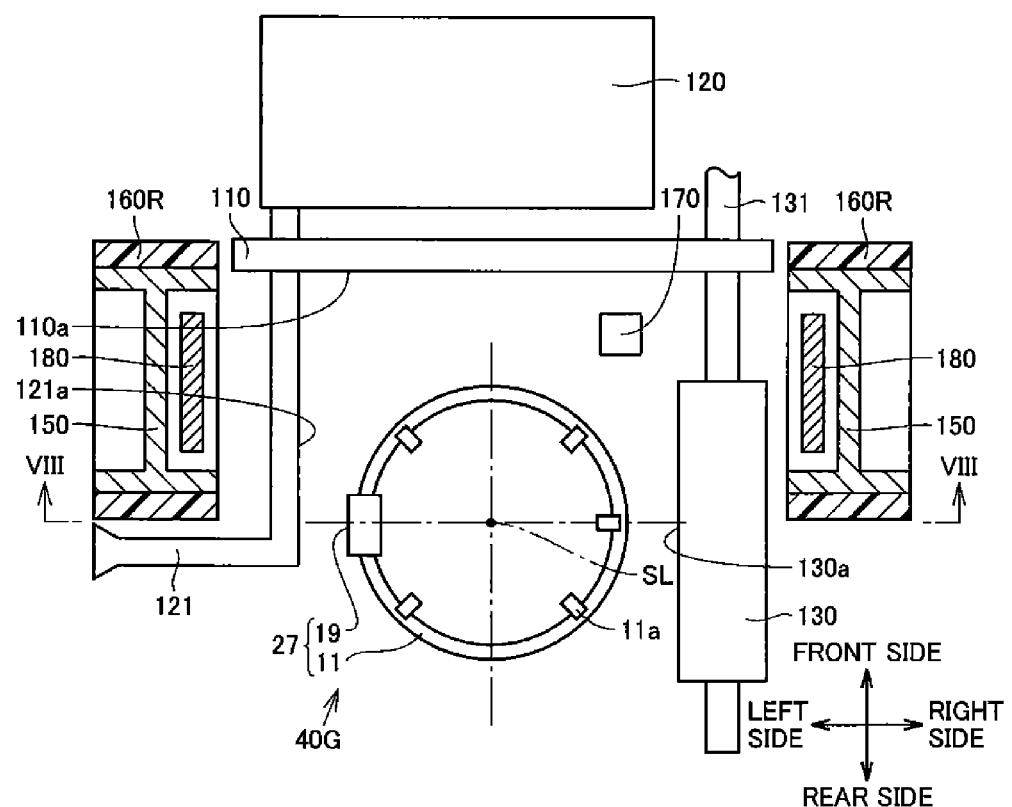
FIG. 31 is a plan view of the rear portion of the vehicle showing a construction of another electric power reception device mounted on the vehicle in each embodiment.

FIG. 31 shows an electric power reception device 40G provided with no electromagnetic induction coil 23 based on the structure shown in FIG. 7. The features of electric power reception device 40G shown in FIG. 31 can be applied mutatis mutandis to all the embodiments described above.

It should be understood that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 electrically powered vehicle; 11, 24, 94, 99 resonant coil; 12, 23, 92, 97 electromagnetic induction coil; 11a, 12a support member; 13 rectifier; 14 DC/DC converter; 15 battery; 16 power control unit; 17 motor unit; 18 vehicle ECU; 19, 25, 98, 95 capacitor; 20 external power feed device; 21 AC power supply; 22 high-frequency electric power driver; 26 control unit; 27, 96 electric power reception portion; 28, 93 electric power transmission portion; 29 impedance regulator; 31 rear floor panel; 32 center floor panel; 32A, 32B side member; 32a, 110a, 121a, 130a, 131a, 270, 710a straight portion; 33 floor panel under engine; 40, 40C, 40F, 40G, 91 electric power reception device; 27b bottom portion; 27S shielding member; 41, 90 electric power transmission device; 42 parking space; 110 rear suspension; 112 front suspension; 120 fuel tank; 121, 123 fuel hose; 130 muffler; 131, 132 exhaust pipe; 150 tire wheel; 160F front wheel tire; 160R rear wheel tire; 170 vehicle height sensor; 180 brake; 181 brake hose; 300 engine; 310 oil pan; 700 radiator; 800 steering mechanism; and 900 window washer tank.

The invention claimed is:
1. A vehicle, comprising:
   a vehicle-mounted component mounted below a floor panel of the vehicle, the vehicle-mounted component is a member selected from the group consisting of a side member, a rear suspension, a front suspension, a fuel tank, a fuel hose, a muffler, an exhaust pipe, a vehicle height sensor, a brake, a brake hose, a battery, and a radiator; and an electric power reception coil disposed below said floor panel, the electric power reception coil being configured to receive electric power in a non-contact manner from an electric power transmission device including an externally provided electric power transmission portion, wherein said vehicle-mounted component is arranged flush with and around said electric power reception coil, said vehicle-mounted component has a surface region facing a region of said electric power reception coil, at least the surface region of said vehicle-mounted component is a material lower in impedance than another region of said vehicle-mounted component, and the surface region of said vehicle-mounted component has a shape in conformity with the region of the electric power reception coil so that said surface region of the vehicle-mounted component is arranged at a constant distance from the region of the electric power reception coil.

2. The vehicle according to claim 1, wherein said floor panel has a surface region facing said electric power reception coil, said surface region of the floor panel being a material lower in impedance than another region of said floor panel.

3. The vehicle according to claim 1, wherein said reception coil is a resonant coil, and the resonant coil has a regular polygonal shape having as one side, said region arranged at the constant distance.

4. The vehicle according to claim 1, wherein said vehicle-mounted component is a muffler or an exhaust pipe, and at least a part of said electric power reception coil is located between a capacitor for the electric power reception coil and said muffler or said exhaust pipe.

5. The vehicle according to claim 1, wherein a difference in natural frequency between said electric power transmission portion and said electric power reception coil is not higher than 10% of the natural frequency of said electric power reception coil.

6. The vehicle according to claim 1, wherein a coefficient of coupling between said electric power reception coil and said electric power transmission portion is not greater than 0.1.

7. The vehicle according to claim 1, wherein said electric power reception coil receives electric power from said electric power transmission portion through at least one of magnetic field formed between said electric power reception coil and said electric power transmission portion and oscillating at a specific frequency and electric field formed between said electric power reception coil and said electric power transmission portion and oscillating at a specific frequency.

8. The vehicle according to claim 1, further comprising a shielding member arranged around said electric power reception coil between said vehicle-mounted component and said electric power reception coil, wherein the shielding member has a geometry in conformity with a shape of said electric power reception coil.

9. A vehicle, comprising:
a vehicle-mounted component mounted below a floor panel of the vehicle, the vehicle-mounted component is a member selected from the group consisting of a side member, a rear suspension, a front suspension, a fuel tank, a fuel hose, a muffler, an exhaust pipe, a vehicle height sensor, a brake, a brake hose, a battery, and a radiator;

an electric power reception coil disposed below said floor panel, the electric power reception coil being configured to receive electric power in a non-contact manner from an electric power transmission device including an externally provided electric power transmission portion; wherein said vehicle-mounted component is arranged flush with and around said electric power reception coil, said vehicle-mounted component has a surface region facing a region of said electric power reception coil, a shielding member is attached to at least the surface region of said vehicle-mounted component, the shielding member being a material lower in impedance than said vehicle-mounted component, and the surface region has a shape in conformity with the region of the electric power reception coil so that said surface region of the vehicle-mounted component is arranged at a constant distance from the region of the electric power reception coil.

10. The vehicle according to claim 9, wherein said floor panel has a surface region facing said electric power reception coil, said surface region of the floor panel being a material lower in impedance than another region of said floor panel.

11. The vehicle according to claim 9, wherein said reception coil is a resonant coil, and the resonant coil has a regular polygonal shape having as one side, said region arranged at the constant distance.

12. The vehicle according to claim 9, wherein said vehicle-mounted component is a muffler or an exhaust pipe, and at least a part of said electric power reception coil is located between a capacitor for the electric power reception coil and said muffler or said exhaust pipe.

13. The vehicle according to claim 9, wherein a difference in natural frequency between said electric power transmission portion and said electric power reception coil is not higher than 10% of the natural frequency of said electric power reception coil.

14. The vehicle according to claim 9, wherein a coefficient of coupling between said electric power reception coil and said electric power transmission portion is not greater than 0.1.

15. The vehicle according to claim 9, wherein said electric power reception coil receives electric power from said electric power transmission portion through at least one of magnetic field formed between said electric power reception coil and said electric power transmission portion and oscillating at a specific frequency and electric field formed between said electric power reception coil and said electric power transmission portion and oscillating at a specific frequency.

16. The vehicle according to claim 9, further comprising a shielding member arranged around said electric power reception coil between said vehicle-mounted component and said electric power reception coil, wherein the shielding member has a geometry in conformity with a shape of said electric power reception coil.

* * * * *